(12) United States Patent
Chen et al.

(10) Patent No.: US 11,655,990 B2
(45) Date of Patent: May 23, 2023

(54) AIR CONDITIONING SYSTEM

(71) Applicant: AIRSYS Refrigeration Engineering Technology (Beijing) Co. Ltd., Beijing (CN)

(72) Inventors: Yunshui Chen, Beijing (CN); Xuming Fang, Beijing (CN); Kai Han, Beijing (CN); Yaguo Ma, Beijing (CN)

(73) Assignee: AIRSYS Refrigeration Engineering Technology (Beijing) Co. Ltd., Beijing (CN)

( * ) Notice: Subject to any disclaimer, the term of this patent is extended or adjusted under 35 U.S.C. 154(b) by 259 days.

(21) Appl. No.: 17/037,722

(22) Filed: Sep. 30, 2020

(65) Prior Publication Data

US 2021/0199315 A1    Jul. 1, 2021

(30) Foreign Application Priority Data

Dec. 31, 2019  (CN) .......................... 201911420019.0

(51) Int. Cl.
*F24F 3/044*  (2006.01)
*F24F 13/10*  (2006.01)
*F24F 13/20*  (2006.01)

(52) U.S. Cl.
CPC .............. *F24F 3/044* (2013.01); *F24F 13/10* (2013.01); *F24F 13/20* (2013.01); *F24F 2221/17* (2013.01)

(58) Field of Classification Search
CPC .. F24F 3/044; F24F 13/10; F24F 13/20; F24F 13/14; F24F 13/30; F24F 2221/17; F24F 2221/36; F24F 1/032; F24F 1/0375; F24F 1/022; F24F 11/89; F24F 12/006; F24F 2013/202; Y02B 30/56

See application file for complete search history.

(56) References Cited

U.S. PATENT DOCUMENTS

| | | | |
|---|---|---|---|
| 5,485,878 A * | 1/1996 | Derks | F24F 3/044 165/250 |
| 2009/0133851 A1* | 5/2009 | Caldwell | F24F 12/006 165/54 |
| 2014/0099086 A1* | 4/2014 | Mercer | F24H 3/0405 392/465 |
| 2015/0219386 A1* | 8/2015 | Zinger | F24F 1/0063 29/890.035 |

(Continued)

FOREIGN PATENT DOCUMENTS

| | | | |
|---|---|---|---|
| CN | 101109550 A * | 1/2008 | |
| CN | 101109550 A | 1/2008 | |

(Continued)

*Primary Examiner* — Emmanuel E Duke
(74) *Attorney, Agent, or Firm* — Gang Yu

(57) ABSTRACT

Some embodiments of the present disclosure provide an air conditioning system. The air conditioning system includes: a housing, having an indoor air supply port; a first heat exchanger, disposed in the housing, an air outlet of the first heat exchanger being communicated with the indoor air supply port; a first air supply mechanism, disposed in the housing, an air outlet of the first air supply mechanism being provided correspondingly to an air inlet of the first heat exchanger; and a plurality of replaceable assemblies, wherein each of the plurality of replaceable assemblies can be assembled in the housing, and the housing is selectively cooperated with one or more of the plurality of replaceable assemblies.

16 Claims, 19 Drawing Sheets

(56) References Cited

U.S. PATENT DOCUMENTS

2016/0128241 A1\*  5/2016  Broglia .............. H05K 7/20945
                                                          62/228.4

FOREIGN PATENT DOCUMENTS

| CN | 204902041 U | \* | 12/2015 |
|----|-------------|----|---------|
| CN | 107143934 A |    | 9/2017  |
| CN | 207035334 U |    | 2/2018  |
| CN | 107806698 A |    | 3/2018  |
| CN | 208090878 U |    | 11/2018 |
| KR | 20040054297 A |  | 6/2004  |

\* cited by examiner

AIR CONDITIONING SYSTEM

CROSS-REFERENCE TO RELATED APPLICATION(S)

The present disclosure claims priority to Chinese Patent Application No. 201911420019.0, filed on Dec. 31, 2019 and entitled "Air Conditioning System", the contents of which are hereby incorporated by reference in its entirety.

TECHNICAL FIELD

The present disclosure relates to a field of air conditioning, and more particularly, to an air conditioning system.

BACKGROUND

In a conventional art, air conditioners are mainly split and integrated. However, when installing the split air conditioner, it is necessary to connect an outdoor unit through a copper pipe. Professional technicians are required to complete installation and debugging, which is likely to cause hidden dangers to product quality due to improper installation. The integrated air conditioner has many internal parts, and the complicated structure makes this product difficult to produce, high in cost, high in power consumption, and complicated in installation and maintenance.

In addition, in an air conditioner known to the inventors, the temperature and humidity of indoor air can only be adjusted, and outdoor fresh air cannot be introduced to improve indoor air quality. The function is relatively simple, and it is difficult to meet different needs of different regions and places.

That is to say, it is necessary to develop an air conditioning system with multiple functions, convenient installation and low installation cost.

SUMMARY

Some embodiments of the present disclosure provide an air conditioning system, which has multiple functions, is convenient to install, and has low installation cost.

Some embodiments of the present disclosure provide an air conditioning system. The air conditioning system includes: a housing, having an indoor air supply port; a first heat exchanger, disposed in the housing, the first heat exchanger includes a first air outlet communicated with the indoor air supply port and a first air inlet; a first air supply mechanism, disposed in the housing, a second air outlet of the first air supply mechanism being provided correspondingly to the first air inlet; and a plurality of replaceable assemblies, wherein each of the plurality of replaceable assemblies can be assembled in the housing, and one or more of the plurality of replaceable assemblies are selectively cooperated with the housing.

In an exemplary embodiment, the housing further has an indoor air return port spaced apart from the indoor air supply port, wherein the plurality of replaceable assemblies include a blind plate assembly, the blind plate assembly is disposed in a first cavity of the housing, a third air outlet of the blind plate assembly is provided correspondingly to a second air inlet of the first air supply mechanism, and a third air inlet of the blind plate assembly is communicated with the indoor air return port.

In an exemplary embodiment, the housing further has a fourth air outlet and a first outdoor air inlet, the blind plate assembly includes two blocking plates arranged oppositely and a connecting plate connecting the two blocking plates, one of the two blocking plates is used to seal the fourth air outlet, and the connecting plate is used to seal the first outdoor air inlet.

In an exemplary embodiment, the housing further has an indoor air return port spaced apart from the indoor air supply port, the plurality of replaceable assemblies include an air baffle assembly and a first air valve assembly disposed separately, the air baffle assembly and the first air valve assembly are both disposed in a first cavity of the housing, and the first air valve assembly is located between the air baffle assembly and the indoor air return port.

In an exemplary embodiment, the air baffle assembly includes a first air duct and a second air duct spaced apart from each other; the first air valve assembly has a first position and a second position; when the first air valve assembly is at the first position, the indoor air return port is communicated with the fourth air outlet of the housing by the first air duct, and a first outdoor air inlet of the housing is communicated with a first air supply port of the air baffle assembly by the second air duct; and when the first air valve assembly is at the second position, the first air valve assembly is blocked between the first outdoor air inlet and the first air supply port, and the indoor air return port is communicated with a second air supply port of the first air valve assembly.

In an exemplary embodiment, the air baffle assembly includes: a third case; and a baffle plate, disposed in the third case, when the air baffle assembly is installed in the first cavity of the housing, a closed space being formed in the air baffle assembly, and the baffle plate partitioning the closed space into the first air duct and the second air duct spaced apart from each other.

In an exemplary embodiment, the housing further has an indoor air return port spaced apart from the indoor air supply port, the multiple replaceable assemblies includes a fresh air heat recovery assembly and a first air valve assembly, the fresh air heat recovery assembly and the first air valve assembly are both disposed in a first cavity of the housing, the fresh air heat recovery assembly includes a first heat exchange passage and a second heat exchange passage exchanging heat with each other, and the first air valve assembly is located between the air baffle assembly and the indoor air return port.

In an exemplary embodiment, the first air valve assembly has a first position and a second position; when the first air valve assembly is at the first position, the indoor air return port is communicated with a fourth air outlet of the housing by the first heat exchange passage, the indoor air return port is communicated with a second air supply port of the first air valve assembly, and a first outdoor air inlet of the housing is communicated with a third air supply port of the fresh air heat recovery assembly by the second heat exchange passage; and when the first air valve assembly is at the second position, the first air valve assembly is blocked between the first outdoor air inlet and the third air supply port of the fresh air heat recovery assembly, and the indoor air return port is communicated with the second air supply port.

In an exemplary embodiment, the fresh air heat recovery assembly further includes: a first case; a fresh air fan, disposed in the first case, the fresh air fan being disposed correspondingly to the first outdoor air inlet, and the fresh air fan being used to transport fresh air from outside into the second heat exchange passage; and a heat exchanger body, disposed in the first case, the first heat exchange passage and the second heat exchange passage being disposed inside the heat exchanger body.

In an exemplary embodiment, the first air valve assembly includes: a second case; a baffle assembly, located in the second case, the baffle assembly including a rotating shaft and a baffle connected to the rotating shaft; and a first air valve actuator, disposed in the second case, the first air valve actuator being drivingly connected to the baffle so that the baffle is rotatably arranged. In an exemplary embodiment, the housing further has a first outdoor air inlet and an indoor air return port spaced apart from the indoor air supply port, the multiple replaceable assemblies includes a second air valve assembly, the second air valve assembly is disposed in a first cavity of the housing, and the second air valve assembly has a first position A and a second position B; when the second air valve assembly is at the first position A, the indoor air return port is communicated with a fourth air outlet of the housing, the first outdoor air inlet is communicated with a fifth air supply port of the second air valve assembly, and the indoor air return port is separated from a fourth air supply port of the second air valve assembly; and when the second air valve assembly is at the second position B, the indoor air return port is communicated with the fourth air supply port of the second air valve assembly, the indoor air return port is separated from the fourth air outlet of the housing, and the first outdoor air inlet is separated from the fifth air supply port of the second air valve assembly.

In an exemplary embodiment, the second air valve assembly includes: a fourth case; a rotary shaft, disposed in the fourth case; an air valve baffle, arranged in the fourth case, the air valve baffle being connected to the rotary shaft; and a second air valve actuator, disposed in the fourth case, the second air valve actuator being drivingly connected with the air valve baffle so that the air valve baffle is rotatably arranged.

In an exemplary embodiment, the air conditioning system further includes an electric heating assembly disposed on the housing, the electric heating assembly being disposed in a drawable manner with respect to the housing.

In an exemplary embodiment, track structures are disposed on side walls of the housing, and two ends of the electric heating assembly are provided with slide grooves cooperated with the track structures.

In an exemplary embodiment, the housing further has a second cavity spaced apart from a first cavity of the housing, and a second heat exchanger and a compressor are disposed in the second cavity.

In an exemplary embodiment, the air conditioning system further includes a condensing fan assembly, the condensing fan assembly being slidably disposed with respect to the housing.

In an exemplary embodiment, the air conditioning system further includes a frequency converter assembly, the frequency converter assembly being slidably disposed with respect to the housing.

By applying the technical solution of some embodiments of the present disclosure, replaceable assemblies with different functions can be disposed in a housing according to actual needs, so that the air conditioning system has different functions and can meet a variety of different application scenarios, thereby expanding an applicable range of the air conditioning system. In addition, the replaceable assembly adopts a modular design, so that the replaceable assembly is matched with the housing, which is simple to install and easy to use, and also facilitates subsequent maintenance and replacement.

BRIEF DESCRIPTION OF THE DRAWINGS

The accompanying drawings, which constitute a part of this application, are used to provide a further understanding of the present disclosure, and the exemplary embodiments of the present disclosure and the description thereof are used to explain the present disclosure, but do not constitute improper limitations to the present disclosure. In the drawings.

Figure 1:
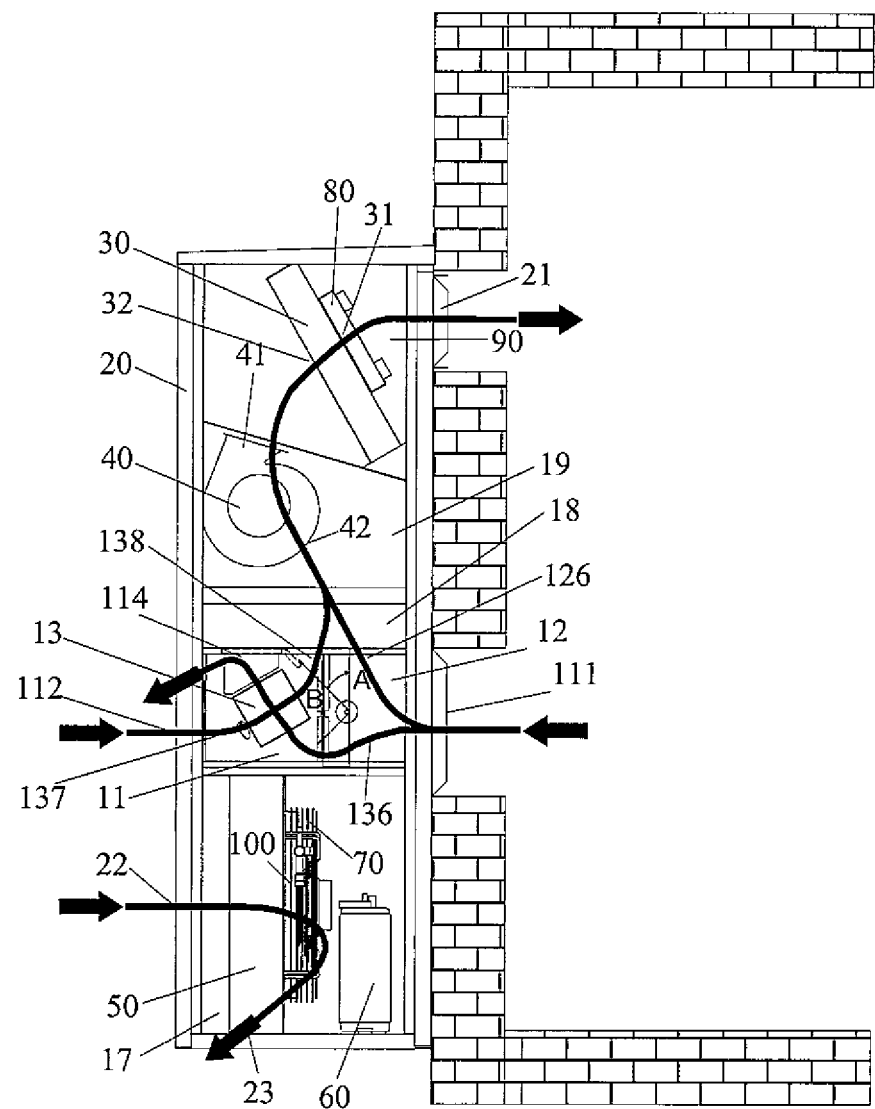
FIG. 1 illustrates a schematic structural composition diagram of an air conditioning system according to embodiment 1 of the present disclosure.

The above drawings include the following reference numerals:

11, first cavity; 111, indoor air return port; 112, first outdoor air inlet; 114, fourth air outlet; 12, first air valve assembly; 121, second case; 1211, second support frame; 1212, second bottom plate; 1214, side baffle; 1215, middle spacer; 122, baffle assembly; 1221, rotating shaft; 1222, baffle; 123, first air valve actuator; 126, second air supply port; 13, fresh air heat recovery assembly; 131, first case; 1311, top plate; 1312, bottom plate; 1313, first side plate; 1314, second side plate; 1315, installation plate; 1316, second installation hole; 1317, installation housing; 1318, guide structure; 1319, chute; 132, fresh air fan; 133, heat exchanger body; 134, fan governor; 135, anti-detachment member; 1351, pivot shaft; 1352, blocking piece; 136, first heat exchange passage; 137, second heat exchange passage; 138, third air supply port; 15, blind plate assembly; 151, blocking plate; 152, connecting plate; 153, third air outlet; 154, third air inlet; 16, air baffle assembly; 161, first air duct; 162, second air duct; 163, first air supply port; 164, third case; 165, partition plate; 17, second cavity; 18, third cavity; 19, fourth cavity; 20, housing; 21, indoor air supply port; 22, second outdoor air inlet; 23, outdoor air outlet; 25, side wall; 251, track structure; 27, emergency switch cover plate; 30, first heat exchanger; 31, first air outlet; 32, first air inlet; 40, first air supply mechanism; 41, second air outlet; 42, second air inlet; 50, second heat exchanger; 60, compressor; 70, reversing valve; 80, electric heating assembly; 81, slide groove; 83, cover plate; 90, fifth cavity; 100, condensing fan assembly; 101, condensing fan; 102, sliding track; 170, frequency converter assembly; 171, electric housing; 172, guide track; 180, second air valve assembly; 181, third air duct; 182, fourth air duct; 183, fourth air supply port; 184, fifth air supply port; 185, fourth case; 1851, support bottom plate; 1852, side wall plate; 1853, upper cover plate; 1854, rear upper plate; 1855, fourth support frame; 186, rotary shaft; 187, second air valve actuator, 188, front sealing plate; 189, air valve baffle.

DETAILED DESCRIPTION OF THE EMBODIMENTS

It is to be noted that in the case of no conflict, the features in the embodiments and the embodiments in the disclosure may be combined with each other. The present disclosure is described below with reference to the drawings and in conjunction with the embodiments in detail.

It is to be noted that unless otherwise specified, all technical and scientific terms used in this application have the same meaning as commonly understood by a person of ordinary skill in the technical field to which this application belongs.

In the present disclosure, the orientation words such as "up, down, top, and bottom" are usually used for the directions shown in the drawings, or for the assemblies themselves in a vertical, perpendicular or gravity direction; likewise, for the convenience of understanding and description, "inside and outside" means inside and outside with respect to the outline of each assembly itself, but the above orientation words are not used to limit the present disclosure.

Some embodiments of the present disclosure provide an integrated heat pump type air conditioning system, and a blind plate assembly 15, an air baffle assembly 16, a first air valve assembly 12, a fresh air heat recovery assembly 13 and a second air valve assembly 180, which are convenient to replace. By selectively installing different assemblies in the air conditioning system, four different functions (i.e., cooling and heat pump operation modes, cooling and heat pump operation modes with fresh air energy saving, cooling and heat pump heat recovery modes with fresh air, and natural cooling mode) can be achieved. Because the above assemblies are plug and play, it is convenient for the air conditioning system to switch functions on the spot. The five assemblies effectively improve production efficiency through modular production. At the same time, customers can replace assemblies according to actual needs to meet application requirements under different conditions and different application scenarios.

In addition, a condensing fan assembly 100, an electric heating assembly 80 and a frequency converter assembly 170 inside the air conditioning system all adopt a drawable installation mode, which is convenient for subsequent installation and maintenance.

In some embodiments of the present disclosure, the air conditioning system includes a housing 20, a first heat exchanger 30, a first air supply mechanism 40, and a plurality of replaceable assemblies. The housing 20 has an indoor air supply port 21; the first heat exchanger 30 is disposed in the housing 20, a first air outlet 31 of the first heat exchanger 30 is communicated with the indoor air supply port 21; the first air supply mechanism 40 is disposed in the housing 20, a second air outlet 41 of the first air supply mechanism 40 is provided correspondingly to a first air inlet 32 of the first heat exchanger 30; and each replaceable assembly can be assembled in the housing 20, and the housing 20 is selectively cooperated with one or more of the plurality of replaceable assemblies.

According to the above arrangement, replaceable assemblies with different functions are arranged in the housing 20 according to actual needs, so that the air conditioning system has different functions and can meet a variety of different application scenarios, thereby expanding an applicable range of the air conditioning system. In addition, the replaceable assembly adopts a modular design, so that the replaceable assembly can be used by being inserted into a matching slot in the housing 20, which is simple to install and easy to use, and also facilitates subsequent maintenance and replacement.

In some embodiments of the present disclosure, the plurality of replaceable assemblies include a blind plate assembly 15, a first air valve assembly 12, a fresh air heat recovery assembly 13, an air baffle assembly 16, and a second air valve assembly 180. The above assemblies are detachably connected with the housing 20 of the air conditioning system. The inventor can install one or more of different replaceable assemblies in the housing 20 according to actual needs, so that the air conditioning system has different working modes and achieves different functions.

It is to be noted that in the embodiments of the present disclosure, the first air valve assembly 12 has a first position and a second position, specifically, a baffle 1222 of the baffle assembly 12 has a first position and a second position. The baffle 1222 can switch between the first position and the second position.

The second air valve assembly 180 has a first position A and a second position B. Specifically, an air valve baffle 189 has the first position A and the second position B, and can be driven by a second air valve actuator 187 to switch between the first position A and the second position B.

In the following, different embodiments are described with reference to the drawings:

Embodiment 1

Figure 2:
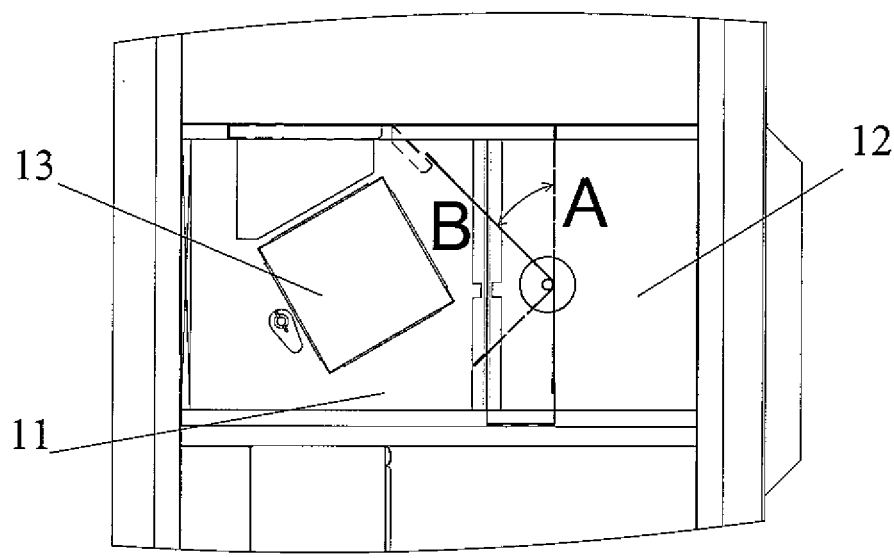
FIG. 2 illustrates a partially enlarged view of the air conditioning system in FIG. 1.
Figure 3:
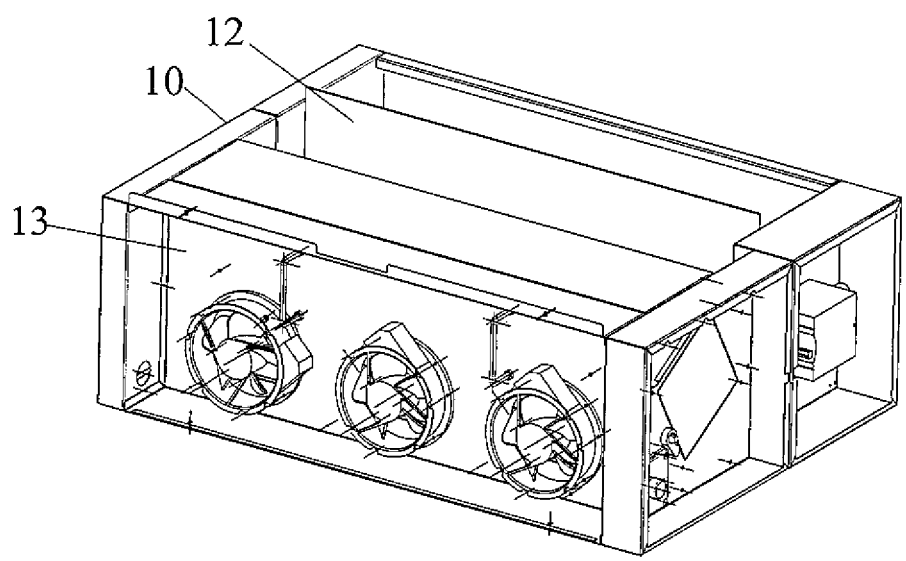
FIG. 3 illustrates a schematic stereostructure diagram of an assembled first air valve assembly and fresh air heat recovery assembly of the air conditioning system in FIG. 1.

As shown in FIG. 1 and FIG. 2. In Embodiment 1 of the present disclosure, the plurality of replaceable assemblies are a fresh air heat recovery assembly 13 and a first air valve assembly 12, the fresh air heat recovery assembly 13 and the first air valve assembly 12 are both disposed in a first cavity 11 of the housing 20, the fresh air heat recovery assembly 13 includes a first heat exchange passage 136 and a second heat exchange passage 137 exchanging heat with each other, and the first air valve assembly 12 is located between the air baffle assembly 13 and the indoor air return port 111.

According to the above arrangement, since the fresh air heat recovery assembly 13 and the first air valve assembly 12 form a modular overall structure, when the overall structure is applied to a field of air conditioning, the above overall structure can be directly embedded in the housing 20 of an air conditioner, labor and installation costs are effectively saved, and assembly efficiency is improved.

In addition, in the embodiments, outdoor fresh air enters the second heat exchange passage 137 of the fresh air heat recovery assembly 13 through the first outdoor air inlet 112, and indoor return air enters the first air valve assembly 12 through the indoor air return port 111. When the air conditioner is in a heating mode (heat pump operation mode), part of indoor return air flows out through the second air supply port 126, and the other part of indoor return air enters the first heat exchange passage 136 of the fresh air heat recovery assembly 13. Thus, outdoor fresh air having a lower temperature in the second heat exchange passage 137 exchanges heat with indoor return air having a higher temperature in the first heat exchange passage 136, so that the temperature of outdoor fresh air in the second heat exchange passage 137 increases, and when the air conditioning system supplies fresh air, a heat recovery function for indoor return air is achieved, thereby reducing the energy consumption of the air conditioning system and meeting the energy-saving requirements of air conditioning equipment. When the air conditioner is in a cooling mode, part of indoor return air flows out through the second air supply port 126, and the other part of the indoor return air enters the first heat exchange passage 136 of the fresh air heat recovery assembly 13. Thus, outdoor fresh air having a higher temperature in the second heat exchange passage 137 exchanges heat with the indoor return air having a lower temperature in the first heat exchange passage 136, so that the temperature of the outdoor fresh air in the second heat exchange passage 137 decreases, and when the air conditioning system supplies fresh air, a heat recovery function for the indoor return air is achieved, thereby reducing the energy consumption of the air conditioning system and meeting the energy-saving requirements of air conditioning equipment.

As shown in FIG. 1 and FIG. 2, in Embodiment 1 of the present disclosure, the first air valve assembly 12 has a first position and a second position; when the first air valve assembly 12 is at the first position, the indoor air return port 111 is communicated with the fourth air outlet 114 of the housing 20 by the first heat exchange passage 136, the indoor air return port 111 is communicated with a second air supply port 126 of the first air valve assembly 12, and the first outdoor air inlet 112 of the housing 20 is communicated with a third air supply port 138 of the fresh air heat recovery assembly 13 by the second heat exchange passage 137; and when the first air valve assembly 12 is at the second position, the first air valve assembly 12 is blocked between the first outdoor air inlet 112 and the third air supply port 138 of the fresh air heat recovery assembly 13, and the indoor air return port 111 is communicated with the second air supply port 126 of the first air valve assembly 12.

In the above arrangement, when the first air valve assembly 12 is at the first position, it cooperates with the fresh air heat recovery assembly 13 to enable the air conditioning system to achieve the functions of suction of outdoor fresh air and heat recovery of indoor return air. When the first air valve assembly 12 is at the second position, since the first air valve assembly 12 is blocked between the first outdoor air inlet 112 and the third air supply port 138 of the fresh air heat recovery assembly 13. Thus, the fresh air heat recovery assembly 13 cannot achieve a heat recovery function of the indoor return air. The indoor return air passes through the second air supply port 126 of the first air valve assembly 12 and finally enters indoors again through the indoor air supply port 21. At this time, the air conditioning system has only simple heating and cooling functions.

As shown in FIG. 2, a dotted line represents the baffle 1222 at the first position A, and a solid line represents the baffle 1222 at the second position B.

Figure 5:
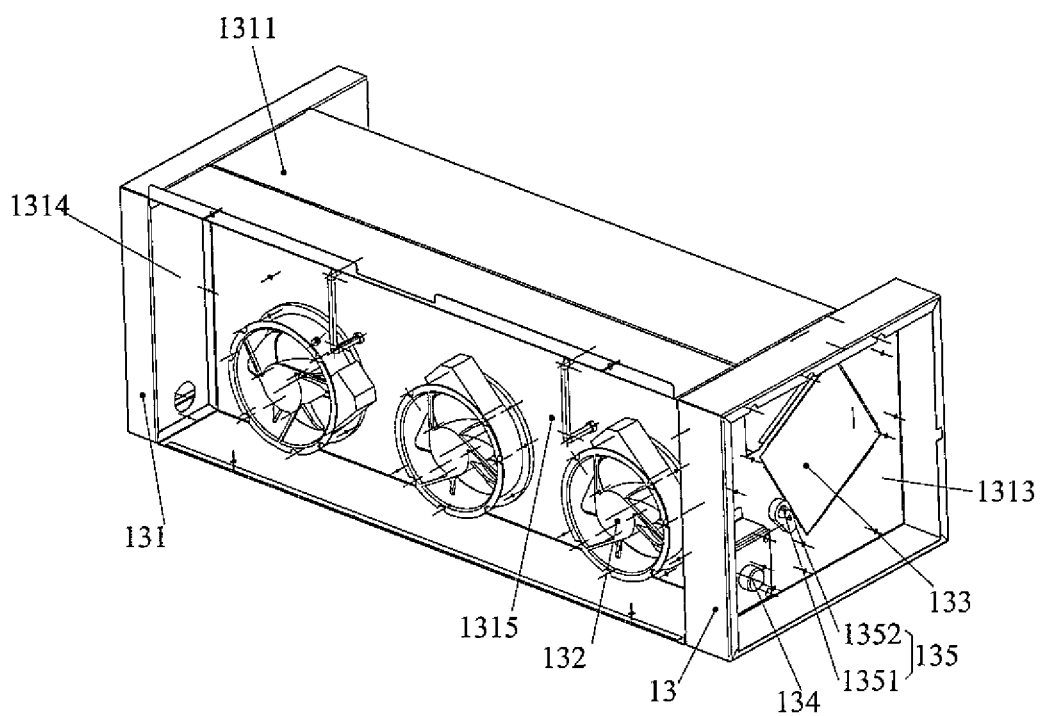
FIG. 5 illustrates a schematic stereostructure diagram of a fresh air heat recovery assembly of the air conditioning system in FIG. 1.
Figure 6:
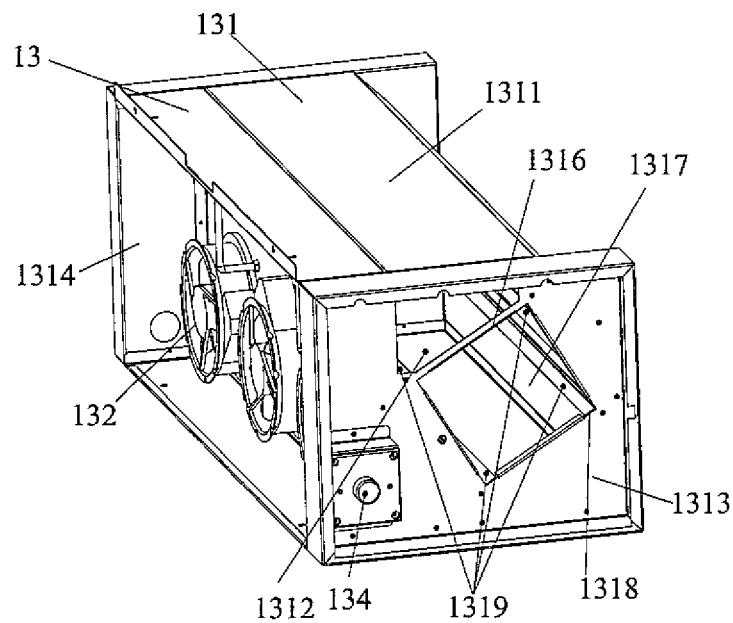
FIG. 6 illustrates a schematic structural composition diagram of the fresh air heat recovery assembly in FIG. 5 (a heat exchanger body is not installed herein)
Figure 7:
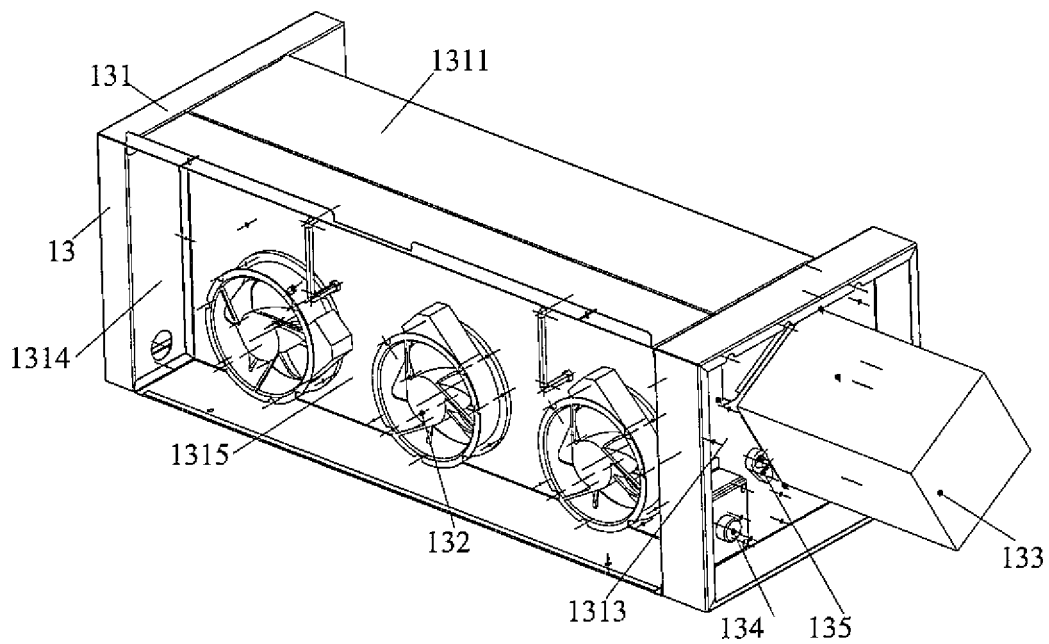
FIG. 7 illustrates a schematic structural composition diagram of the fresh air heat recovery assembly in FIG. 5 (a heat exchanger body is shown herein)

As shown in FIG. 5 to FIG. 7, in Embodiment 1 of the present disclosure, the fresh air heat recovery assembly 13 further includes a first case 131, a fresh air fan 132 and a heat exchanger body 133. The fresh air fan 132 is disposed in the first case 131, the fresh air fan 132 is disposed correspondingly to the first outdoor air inlet 112, and the fresh air fan 132 is used to transport fresh air from outside into the second heat exchange passage 137; and the heat exchanger body 133 is disposed in the first case 131, and the first heat exchange passage 136 and the second heat exchange passage 137 are disposed inside the heat exchanger body 133.

According to the above arrangement, the heat exchanger body 133 uses the first heat exchange passage 136 and the second heat exchange passage 137 therein to achieve the heat recovery function for the indoor return air. In addition, the heat-recovered indoor return air is discharged through the first heat exchange passage 136, the outdoor fresh air is transported into the first air supply mechanism 40 through the second heat exchange passage 137, and the outdoor fresh air and the indoor return air are transported indoors by using the first air supply mechanism 40. The first case 131 provides an installation space for the fresh air fan 132 and the heat exchanger body 133. In this way, the first case 131, the fresh air fan 132 and the heat exchanger body 133 form a modular overall structure, which can directly embed the fresh air heat recovery assembly 13 in the first cavity 11, thereby effectively improving the assembly efficiency of the air conditioning system and saving the installation cost.

As shown in FIG. 5 to FIG. 7, in Embodiment 1 of the present disclosure, the fresh air heat recovery assembly 13 further includes a fan governor 134 for adjusting a rotation speed of the fresh air fan 132, and the fan governor 134 is disposed in the first case 131.

In the above arrangement, the fan governor 134 mainly adjusts a suction volume of outdoor fresh air into the fresh air fan 132 by adjusting the rotation speed of the fresh air fan 132. In this way, the rotation speed of the fresh air fan 132 is adjusted according to an actual situation, thereby adjusting an intake amount of fresh air. It is to be noted that the fan governor 134 is configured to adjust the rotation speed of the fresh air fan 132, and the magnitude of the rotation speed will affect the intake amount of fresh air.

In an embodiment of the present disclosure, as shown in FIG. 5 to FIG. 7, the first case 131 includes a top plate 1311 and a bottom plate 1312 arranged oppositely, and a first side plate 1313 and a second side plate 1314 for connecting the top plate 1311 and the bottom plate 1312, the first side plate 1313 opposites to the second side plate 1314. In the above arrangement, the first case 131 is simple in structure and convenient to assemble.

In an embodiment of the present disclosure, as shown in FIG. 5 to FIG. 7, the fresh air heat recovery assembly 13 further includes an installation plate 1315 disposed in the first case 131, the installation plate 1315 is provided with a first installation hole for installing the fresh air fan 132, and the installation plate 1315 is connected with the bottom plate 1312.

In the above arrangement, the first case 131 is formed by connecting different plate bodies, which facilitates the installation of other assemblies of the fresh air heat recovery assembly 13. The above plate bodies can all adopt standard steel plates, convenient for processing and saves costs.

Of course, in alternative embodiments not shown in the drawings of the present disclosure, the installation plate 1315 is connected with both the bottom plate 1312 and the top plate 1311.

Specifically, as shown in FIG. 6, in Embodiment 1 of the present disclosure, the first side plate 1313 is provided with a second installation hole 1316, and the fresh air heat recovery assembly 13 further includes an installation housing 1317 located in the first case 131. The installation housing 1317 is provided with an opening communicated with the second installation hole 1316. The heat exchanger body 133 is inserted into the installation housing 1317 through the second installation hole 1316 and the opening.

Of course, in alternative embodiments not shown in the drawings of the present disclosure, the second installation hole 1316 is disposed on the second side plate 1314 according to the actual situation.

Specifically, as shown in FIG. 6 and FIG. 7, in Embodiment 1 of the present disclosure, the fresh air heat recovery assembly 13 further includes a guide structure 1318 for guiding the heat exchanger body 133, and the guide structure 1318 includes a chute 1319 provided in the installation housing 1317.

In the above arrangement, a sliding fit of the chute 1319 and edges of the heat exchanger body 133 enables the heat exchanger body 133 to be smoothly pulled out or inserted into the installation housing 1317, which facilitates the installation and replacement of the heat exchanger body 133, thereby improving the maintenance and disassembly efficiency of the fresh air heat recovery assembly 13.

Of course, in alternative embodiments not shown in the drawings of the present disclosure, the guide structure 1318 further includes a slider provided in the installation housing 1317 and a chute 1319 provided on an outer wall of the heat exchanger body 133 and cooperated with the slider.

As shown in FIG. 5 and FIG. 7, in Embodiment 1 of the present disclosure, the fresh air heat recovery assembly 13 further includes an anti-detachment member 135 for preventing the heat exchanger body 133 from detaching out of the first case 131. In the above arrangement, the anti-detachment member 135 can lock the heat exchanger body 133 at a working position, thereby ensuring that the fresh air heat recovery assembly 13 can work normally.

Specifically, as shown in FIG. 5 and FIG. 7, the anti-detachment member 135 includes a pivot shaft 1351 connected with an outer wall surface of the first case 131 and a blocking piece 1352 pivotally connected with the pivot shaft 1351. The blocking piece 1352 has a locking position abutting against the outer wall of the heat exchanger body 133 and an unlocking position separated from the heat exchanger body 133.

In the above arrangement, when the heat exchanger body 133 is in a locked state, the blocking piece 1352 abuts against the outer wall of the heat exchanger body 133, thereby locking the heat exchanger body 133 to the installation housing 1317, thereby ensuring that the fresh air heat recovery assembly 13 can work normally. By rotating the blocking piece 1352, the blocking piece 1352 is not in contact with the outer wall of the heat exchanger body 133, so that the heat exchanger body 133 can be taken out from the installation housing 1317 for easy replacement or installation.

Figure 4:
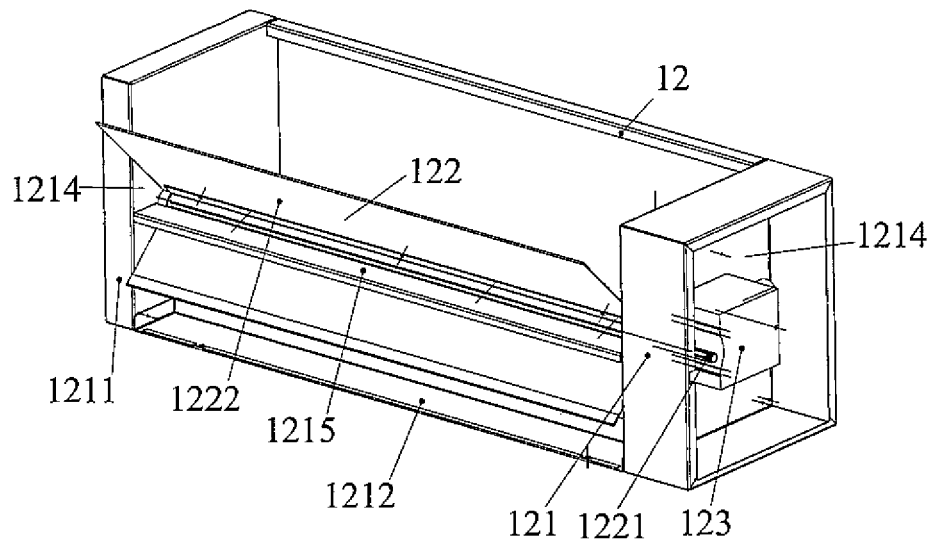
FIG. 4 illustrates a schematic stereostructure diagram of a first air valve assembly of the air conditioning system in FIG. 1.

As shown in FIG. 4, in Embodiment 1 of the present disclosure, the first air valve assembly 12 includes a second case 121, a baffle assembly 122 and a first air valve actuator 123. The baffle assembly 122 is located in the second case 121, the baffle assembly 122 includes a rotating shaft 1221 and a baffle 1222 connected with the rotating shaft 1221, the first air valve actuator 123 is disposed on the second case 121, and the first air valve actuator 123 is drivingly connected with the baffle 1222.

According to the above arrangement, the second case 121 provides an installation space for the baffle assembly 122 and the first air valve actuator 123. The first air valve actuator 123 is used to drive the rotating shaft 1221 of the baffle assembly 122 to rotate, thereby driving the baffle 1222 to rotate, enabling the first air valve assembly 12 to control the amount of fresh air, or achieving the function of turning on or off the intake of fresh air.

Specifically, as shown in FIG. 4, in Embodiment 1 of the present disclosure, the second case 121 includes a second support frame 1211, a second bottom plate 1212, a side baffle 1214, and a middle spacer 1215. The second bottom plate 1212 is disposed at a bottom of the second support frame 1211. There are two side baffles 1214, which are respectively disposed at opposite left and right ends of the second support frame 1211. The middle spacer 1215 is disposed in a middle of the second support frame 1211. The first air valve actuator 123 is disposed on one of the two side baffles 1214, and the first air valve actuator 123 is connected with the rotating shaft 1221.

As shown in FIG. 1 and FIG. 2, in Embodiment 1 of the present disclosure, when the first air valve assembly 12 is at the first position, the indoor air return port 111 is both communicated with the second air supply port 126 of the first air valve assembly 12 and the fourth air outlet 114 of the housing 20, and the first outdoor air inlet 112 is communicated with a third air supply port 138 of the fresh air heat recovery assembly 13 by the second heat exchange passage 137; and when the first air valve assembly 12 is at the second position, the first air valve assembly 12 is blocked between the first outdoor air inlet 112 and the third air supply port 138 of the fresh air heat recovery assembly 13, and the indoor air return port 111 is communicated with the second air supply port 126 of the first air valve assembly 12.

In the above arrangement, the first air valve assembly 12 can adjust a relative rotation angle of the baffle 1222 in the baffle assembly 122 and the second case 121, so that the first air valve assembly 12 is at the first position and cooperates with the fresh air heat recovery assembly 13 to achieve the functions of suction of outdoor fresh air and heat recovery of indoor return air.

Specifically, as shown in FIG. 1 and FIG. 2, in Embodiment 1 of the present disclosure, when the baffle 1222 is rotated to the position A, the first air valve assembly 12 is at the first position, and when the baffle 1222 is rotated to the position B, the first air valve assembly 12 is at the second position. When the first air valve assembly 12 is at the second position, the first air valve assembly 12 can block outdoor fresh air from entering the first air supply mechanism 40.

Figure 8:
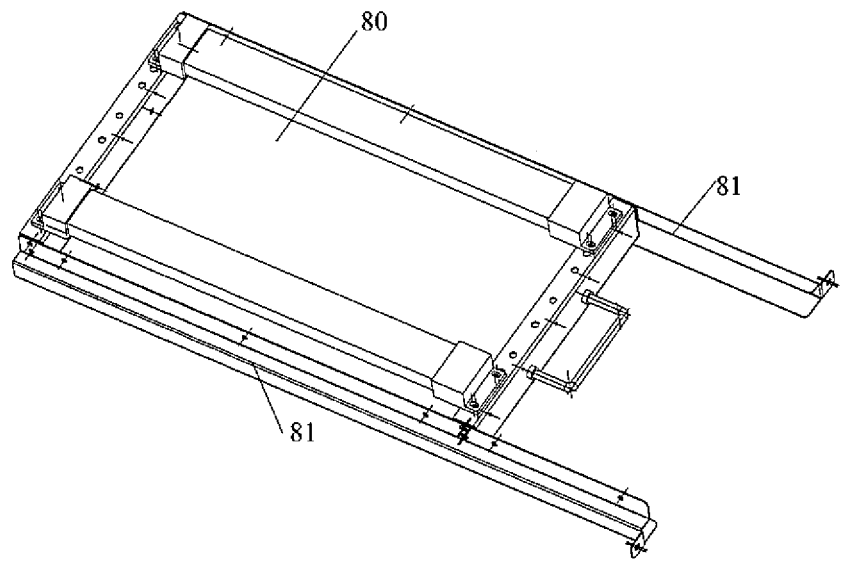
FIG. 8 illustrates a schematic stereostructure diagram of an electric heating assembly of the air conditioning system in FIG. 1.
Figure 9:
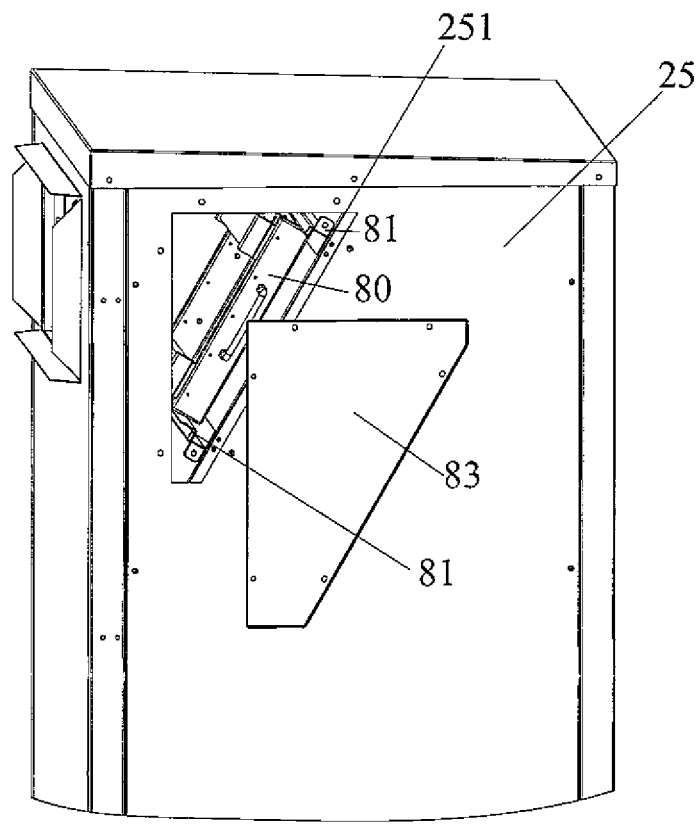
FIG. 9 illustrates a schematic assembly and maintenance diagram of an electric heating assembly of the air conditioning system in FIG. 1.

As shown in FIG. 8 and FIG. 9, in some embodiments of the present disclosure, the air conditioning system further includes an electric heating assembly 80 disposed in the housing 20. The electric heating assembly 80 is arranged in a drawable manner with respect to the housing 20.

In the above arrangement, the electric heating assembly 80 can be taken out of the housing 20 or the electric heating assembly 80 can be installed in the housing 20, which facilitates the disassembly and installation of the electric heating assembly 80, thereby improving the assembly efficiency of the air conditioning system. When the air conditioning system is in a heating mode, the electric heating assembly 80 can continue to heat hot air at a first air outlet 31 of the first heat exchanger 30, which can further increase the temperature of the hot air entering indoors, thereby meeting the warming needs of users. When the air conditioning system is in a cooling mode, the electric heating assembly 80 is turned off.

Specifically, as shown in FIG. 8 and FIG. 9, in Embodiment 1 of the present disclosure, track structures 251 are disposed on side walls 25 of the housing 20, and two sides of the electric heating assembly 80 are provided with slide grooves 81 cooperated with the track structures 251. In the above arrangement, the cooperation of the track structures 251 and the slide grooves 81 can reduce a frictional force of the electric heating assembly 80 sliding out of the housing 20, so that the rapid installation or disassembly of the electric heating assembly 80 can be achieved, and the assembly efficiency of the air conditioning system is further improved.

Figure 13:
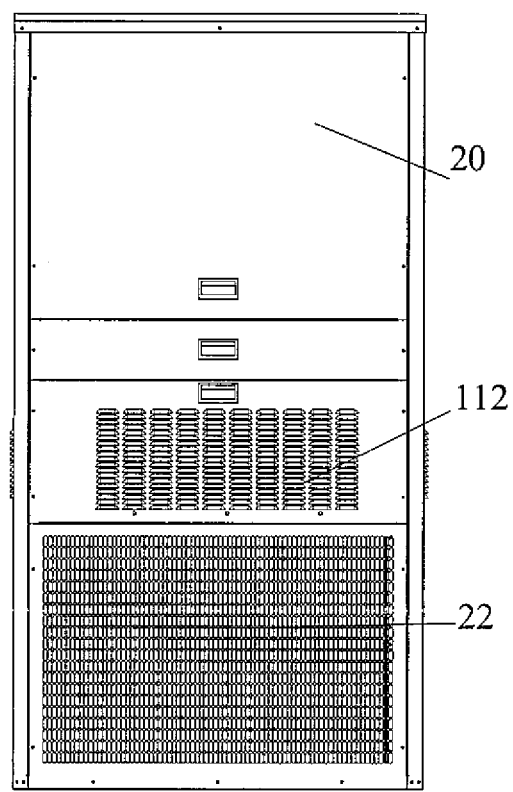
FIG. 13 illustrates a front view of a housing of the air conditioning system in FIG. 1.
Figure 14:
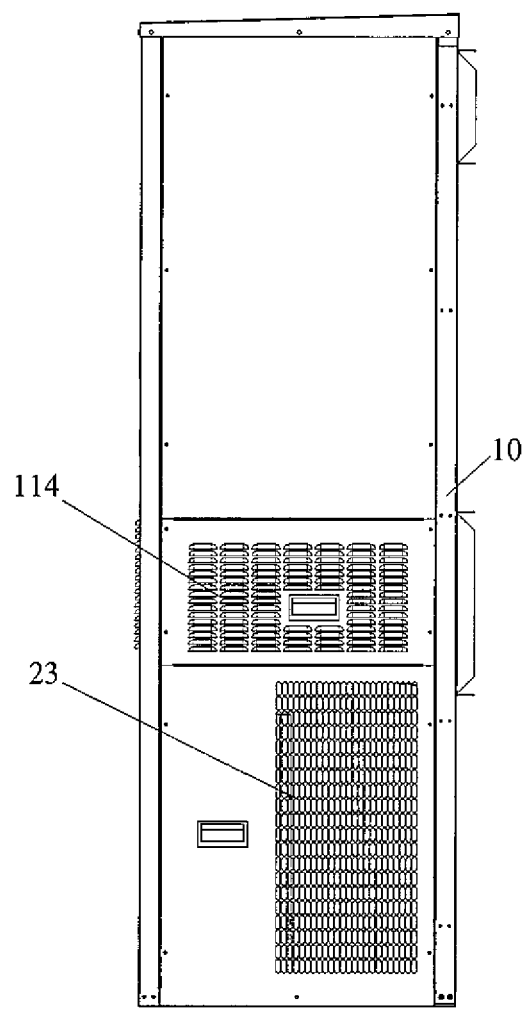
FIG. 14 illustrates a right view of the housing in FIG. 13.
Figure 15:
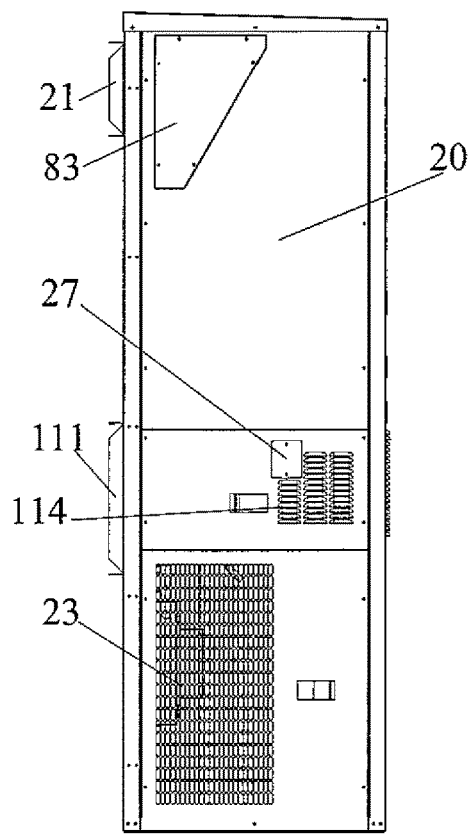
FIG. 15 illustrates a left view of the housing in FIG. 13.

Specifically, as shown in FIG. 13 to FIG. 15, in Embodiment 1 of the present disclosure, the housing 20 is a case structure, a side (that is, a front panel of the air conditioning system) of the housing 20 away from a position to be installed (for example, a wall) is provided with a first outdoor air inlet 112 and a second outdoor air inlet 22, and an indoor air supply port 21 and an indoor air return port 111 are provided on a side of the housing 20 near the room. The first outdoor air inlet 112 is located above the second outdoor air inlet 22, and the indoor air supply port 21 is arranged above the indoor air return port 111. The left and right sides of the housing 20 are provided with outdoor air outlets 23, the right side of the housing 20 is provided with a fourth air outlet 114, an emergency switch cover plate 27 and a cover plate 83 from bottom to top, and the left side of the housing 20 is also provided with a fourth air outlet 114.

As shown in FIG. 1, in some embodiments of the present disclosure, the housing 20 further has a second cavity 17 spaced apart from the first cavity 11 of the housing 20, and the second cavity 17 is provided with a second heat exchanger 50, a compressor 60 and a reversing valve 70.

Specifically, as shown in FIG. 1, in an embodiment of the present disclosure, a first partition, a second partition, a third partition and a fourth partition are disposed in sequence in the housing 20 from bottom to top. The first partition and the bottom support plate of the housing 20 form the second cavity 17. The first partition, the second partition and the housing 20 form the first cavity 11. The second partition, the third partition and the housing 20 form a third cavity 18. The third partition, the fourth partition and the housing 20 form a fourth cavity 19. The fourth partition and the top cover plate of the housing 20 form a fifth cavity 90. The first cavity 11 is configured to install the first air valve assembly 12 and the fresh air heat recovery assembly 13, and the second cavity 17 is configured to install the second heat exchanger 50, the compressor 60 and the reversing valve 70. The third cavity 18 provides a mixing space for the outdoor fresh air output from the third air supply port 138 and the indoor return air output from the second air supply port 126, so that the outdoor fresh air and the indoor return air are fully mixed. The fourth cavity 19 is configured to install the first air supply mechanism 40, and the fifth cavity 90 is configured to install the first heat exchanger 30 and the electric heating assembly 80. The housing 20 also has a second outdoor air inlet 22 and an outdoor air outlet 23 both communicated with the second cavity 17. The compressor 60 is connected with the second heat exchanger 50. The reversing valve 70 is connected with the second heat exchanger 50, the first heat exchanger 30 and the compressor 60, respectively.

Of course, in alternative embodiments not shown in the drawings of the present disclosure, the third cavity 18 and the fourth cavity 19 can be set into one cavity according to the actual situation.

Figure 10:
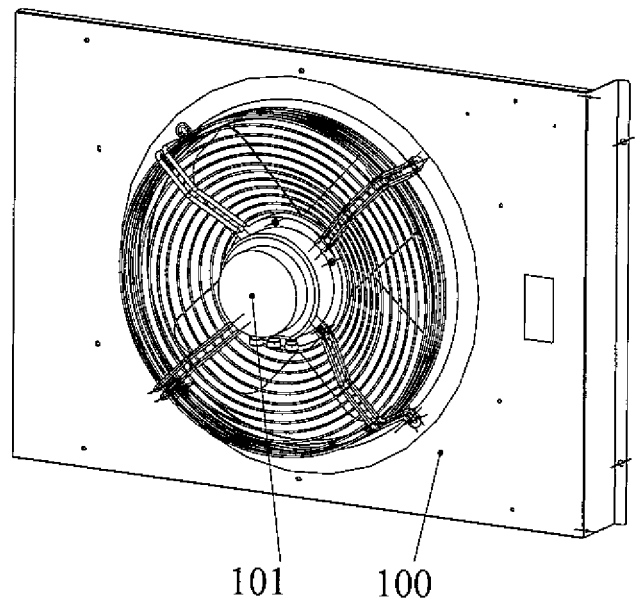
FIG. 10 illustrates a schematic stereostructure diagram of a condensing fan assembly of the air conditioning system in FIG. 1.
Figure 11:
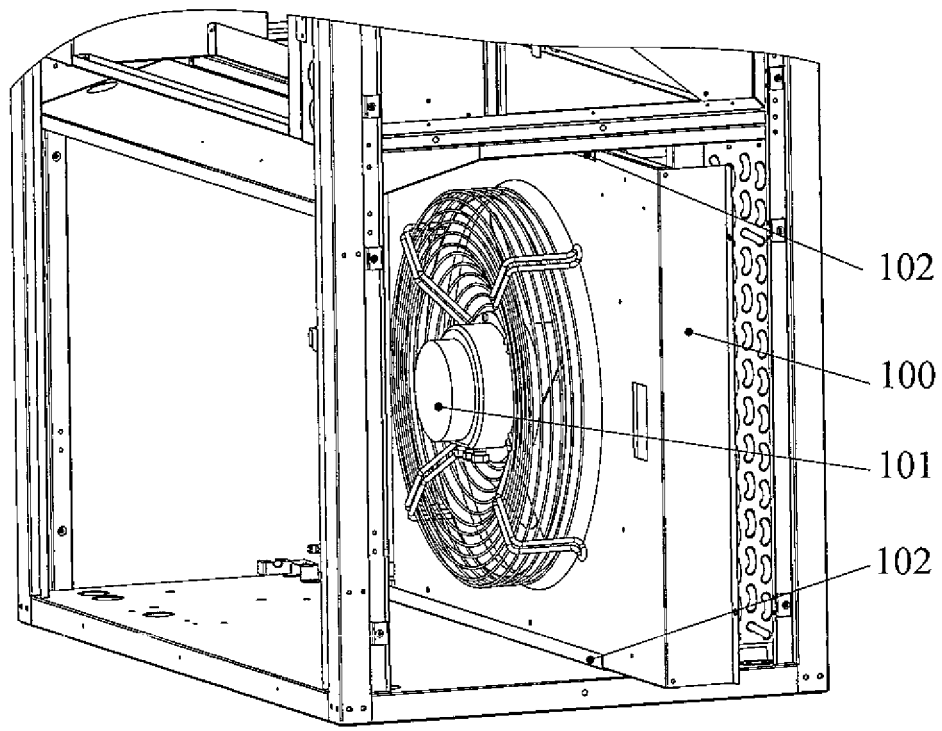
FIG. 11 illustrates a schematic assembly and maintenance diagram of an assembled condensing fan assembly and housing of the air conditioning system in FIG. 1.

Specifically, as shown in FIG. 10 and FIG. 11, in Embodiment 1 of the present disclosure, the second heat exchanger 50 is provided with a condensing fan assembly 100, and the condensing fan assembly 100 includes a condensing fan 101. The condensing fan assembly 100 is provided with sliding tracks 102 on both sides, and the two sliding tracks 102 cooperate with sliders provided in the housing 20, so that the condensing fan assembly 100 can be easily taken out from the housing 20, thereby improving the assembly and maintenance efficiency of the condensing fan assembly 100.

Figure 12:
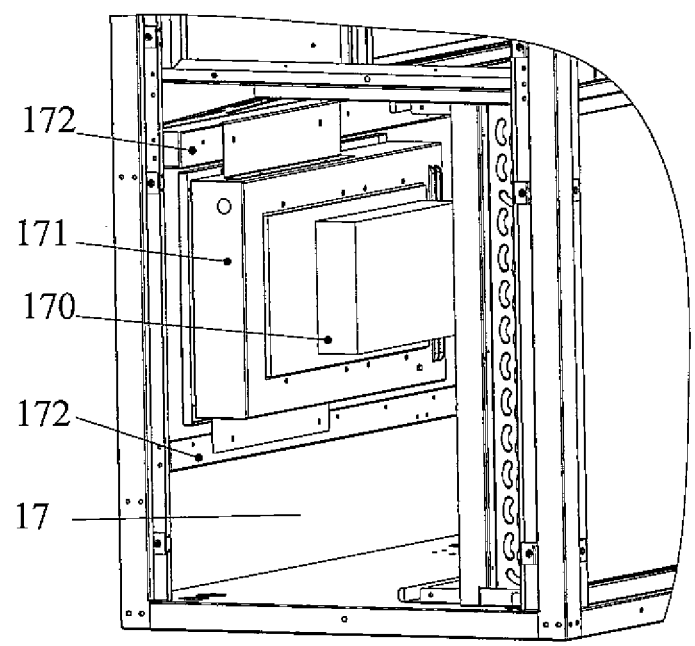
FIG. 12 illustrates a schematic maintenance diagram of a frequency converter assembly of the air conditioning system in FIG. 1.

Specifically, as shown in FIG. 12, in Embodiment 1 of the present disclosure, a frequency converter assembly 170 is disposed in the second cavity 17, and the frequency converter assembly 170 includes an electric housing 171 and a frequency converter disposed in the electric housing 171. The frequency converter is configured to adjust a working frequency of the compressor 60 so that the compressor 60 works at a proper frequency, thereby meeting the energy-saving requirements of the air conditioning system. A guide track 172 is disposed on a side of the frequency converter assembly 170, and the guide track 172 cooperates with a guide groove provided in the second cavity 17, which facilitates the disassembly and installation of the frequency converter assembly 170, thereby improving an installation efficiency of the frequency converter assembly 170.

Figure 16:
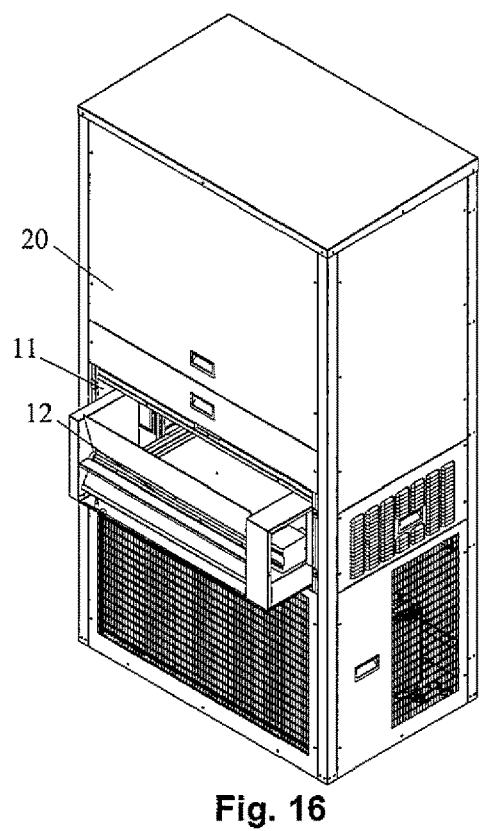
FIG. 16 illustrates a schematic stereostructure diagram of the first air valve assembly in FIG. 4 cooperated with a housing (the first air valve assembly has not been completely installed in the housing herein)
Figure 17:
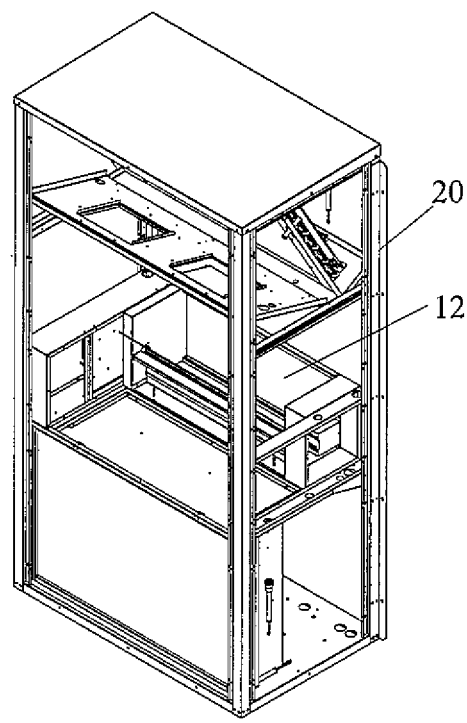
FIG. 17 illustrates a schematic stereostructure diagram of the first air valve assembly in FIG. 4 completely assembled with a housing (an installation panel on the housing is not shown herein)

Specifically, as shown in FIG. 16 and FIG. 17, in Embodiment 1 of the present disclosure, the first air valve assembly 12 is disposed in the housing 20 in a detachable manner. When the first air valve assembly 12 needs to be installed, the first air valve assembly 12 is pushed into the first cavity 11 from one side of the housing 20 until it cannot be pushed, and the first air valve assembly 12 is fixed into the first cavity 11 by bolts.

Figure 18:
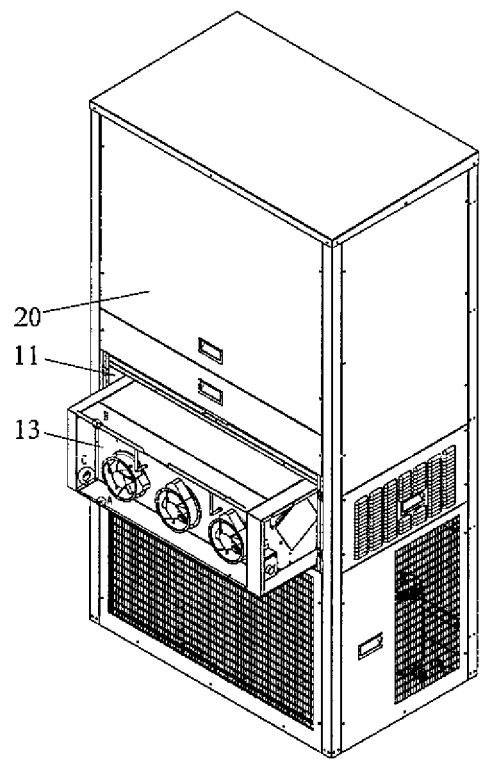
FIG. 18 illustrates a schematic stereostructure diagram of the fresh air heat recovery assembly in FIG. 5 cooperated with a housing (the fresh air heat recovery assembly is not completely installed in the housing herein)
Figure 19:
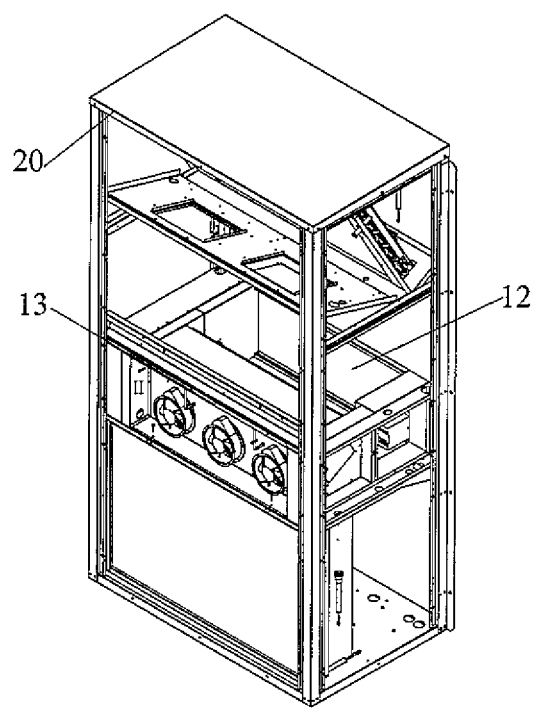
FIG. 19 illustrates a schematic stereostructure diagram of the fresh air heat recovery assembly in FIG. 5 completely assembled with a housing (an installation panel on the housing is not shown herein)

Specifically, as shown in FIG. 18 and FIG. 19, in Embodiment 1 of the present disclosure, after the first air valve assembly 12 is completely installed, the fresh air heat recovery assembly 13 is pushed into the first cavity 11 from one side of the housing 20 until it cannot be pushed, and the fresh air heat recovery assembly 13 is fixed into the first cavity 11 by bolts.

Embodiment 2

The difference between Embodiment 2 and Embodiment 1 lies in: First, as shown in FIG. 20, in Embodiment 2 of the present disclosure, the plurality of replaceable assemblies include an air baffle assembly 16 and a first air valve assembly 12 disposed separately, the air baffle assembly 16 and the first air valve assembly 12 are both disposed in the first cavity 11 of the housing 20, and the first air valve assembly 12 is located between the air baffle assembly 16 and the indoor air return port 111.

According to the above arrangement, the air baffle assembly 16 and the first air valve assembly 12 are used in combination, and can have a fresh air function (that is, transporting outdoor fresh air indoors). In this way, while the air conditioning system has cooling and heating functions, it also has the function of introducing fresh air.

Figure 20:
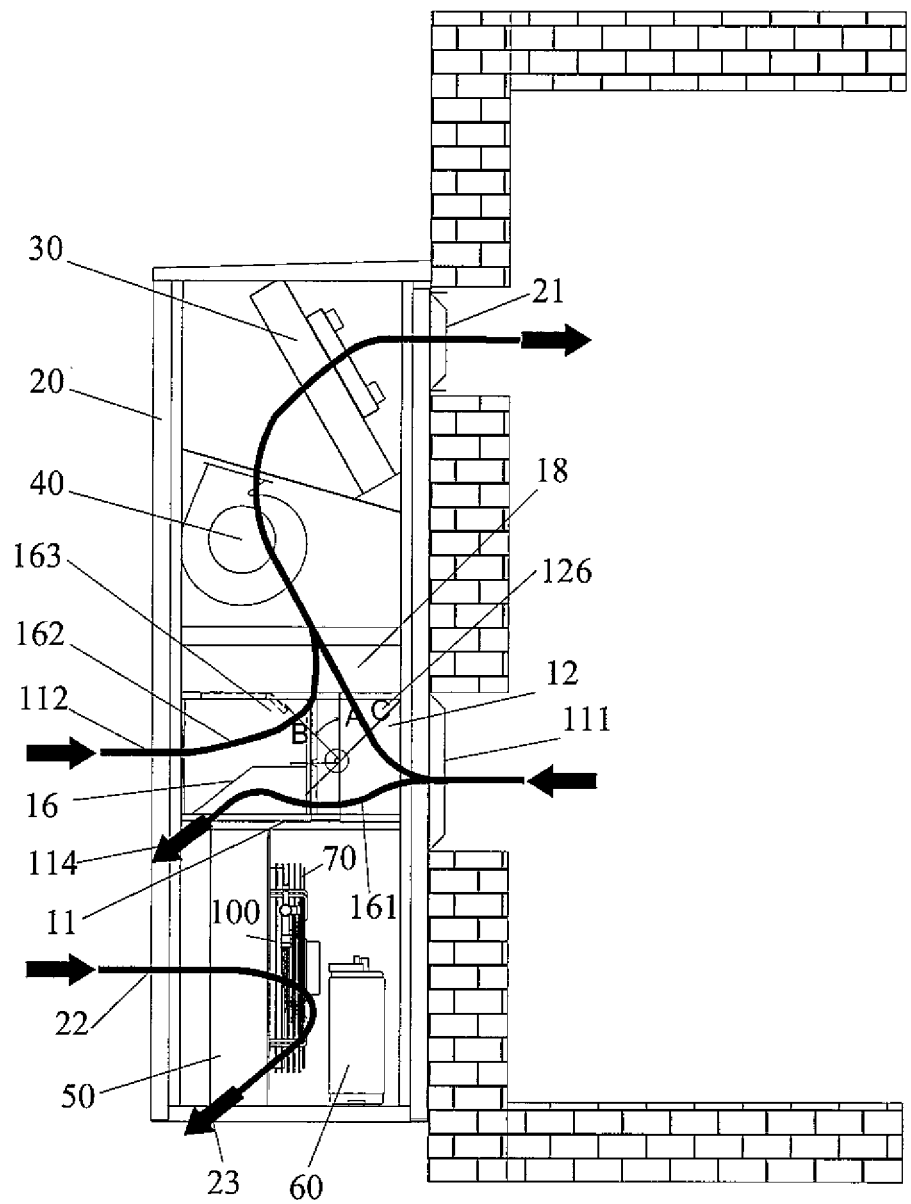
FIG. 20 illustrates a schematic structural composition diagram of an air conditioning system according to embodiment 2 of the present disclosure.

Second, as shown in FIG. 20, in Embodiment 2 of the present disclosure, the air baffle assembly 16 includes a first air dud 161 and a second air duct 162 spaced apart from each other; the first air valve assembly 12 has a first position and a second position; when the first air valve assembly 12 is at the first position, the indoor air return port 111 is communicated with the fourth air outlet 114 of the housing 20 by the first air duct 161, and the first outdoor air inlet 112 of the housing 20 is communicated with a first air supply port 163 of the air baffle assembly 16 by the second air duct 162; and when the first air valve assembly 12 is at the second position, the first air valve assembly 12 is blocked between the first outdoor air inlet 112 and the first air supply port 163 of the air baffle assembly 16, and the indoor air return port 111 is communicated with a second air supply port 126 of the first air valve assembly 12.

According to the above arrangement, when the first air valve assembly 12 is at the first position, the outdoor fresh air enters the third cavity 18 through the first air duct 161, and the indoor return air enters the third cavity 18 through the second air supply port 126 of the first air valve assembly 12, and finally enters indoors through the indoor air supply port 21, thereby achieving the function of the air conditioning system transporting outdoor fresh air indoors. When the first air valve assembly 12 is at the second position, the outdoor fresh air is blocked by the first air valve assembly 12. At this time, the air conditioning system has only heating and cooling functions.

Figure 21:
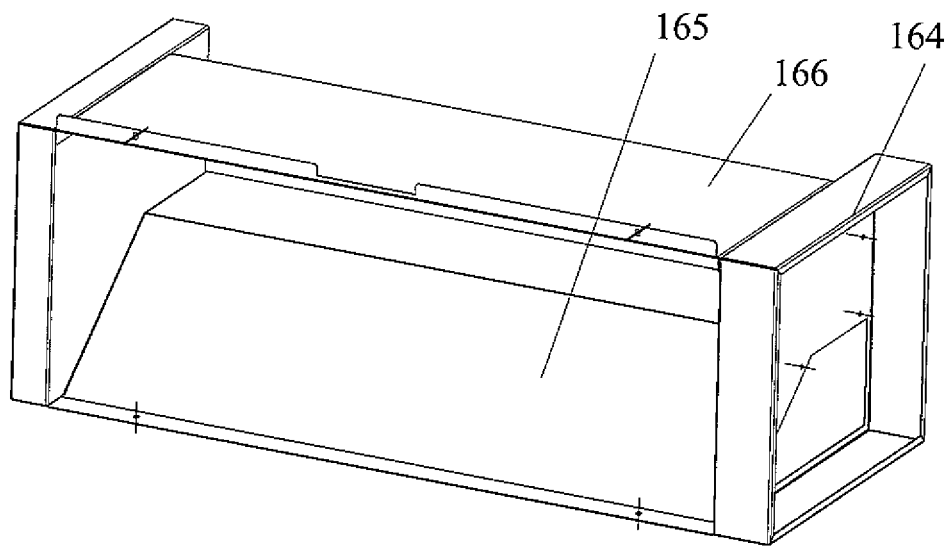
FIG. 21 illustrates a schematic stereostructure diagram of an air baffle assembly of the air conditioning system in FIG. 20.

Third, as shown in FIG. 20 and FIG. 21, in Embodiment 2 of the present disclosure, the air baffle assembly 16 includes a third case 164 and a baffle plate 165. The baffle plate 165 is disposed in the third case 164, when the air baffle assembly 16 is installed in the first cavity 11 of the housing 20, a closed space is formed in the air baffle assembly 16, and the baffle plate 165 partitions the closed space into the first air duct 161 and the second air duct 162 spaced apart from each other.

Figure 22:
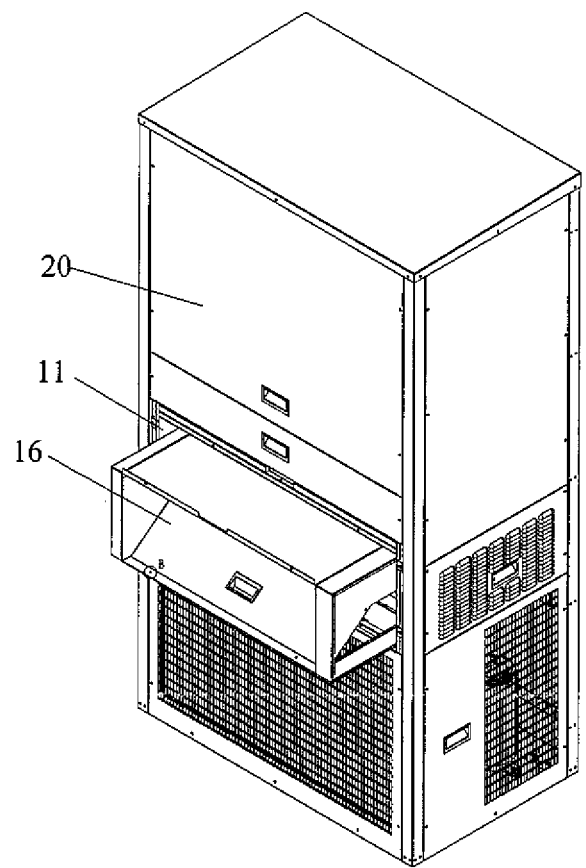
FIG. 22 illustrates a schematic stereostructure diagram of an air baffle assembly of the air conditioning system in FIG. 20 cooperated with a housing (the air baffle assembly has not been completely installed in the housing herein)
Figure 23:
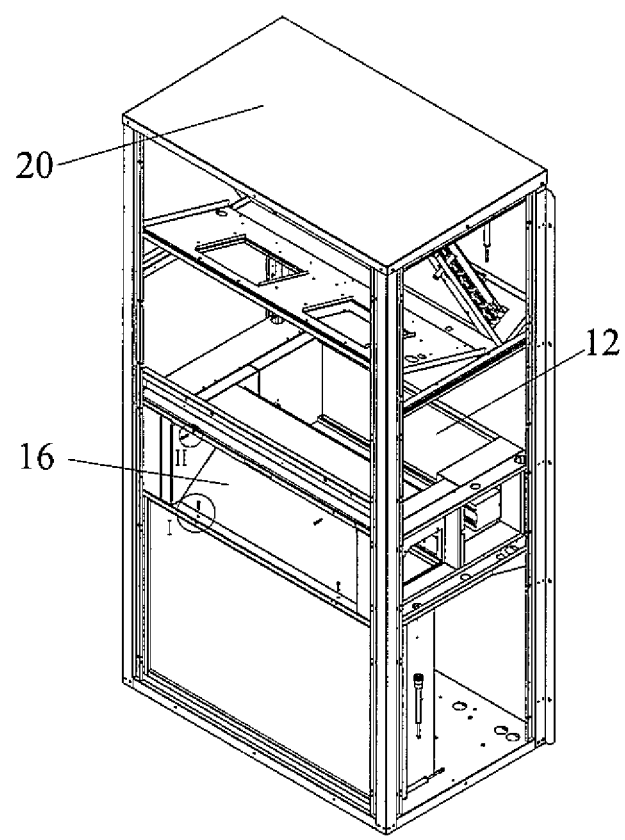
FIG. 23 illustrates a schematic stereostructure diagram of an air baffle assembly of the air conditioning system in FIG. 20 completely assembled with a housing (an installation panel on the housing is not shown herein)

Fourth, as shown in FIG. 22 and FIG. 23, in Embodiment 2 of the present disclosure, after the first air valve assembly 12 is completely installed, the air baffle assembly 16 is pushed into the first cavity 11 from one side of the housing 20 until it cannot be pushed, and the air baffle assembly 16 is fixed into the first cavity 11 by bolts.

The other structures of Embodiment 2 are the same as those of Embodiment 1, and are not repeated here.

Embodiment 3

Figure 24:
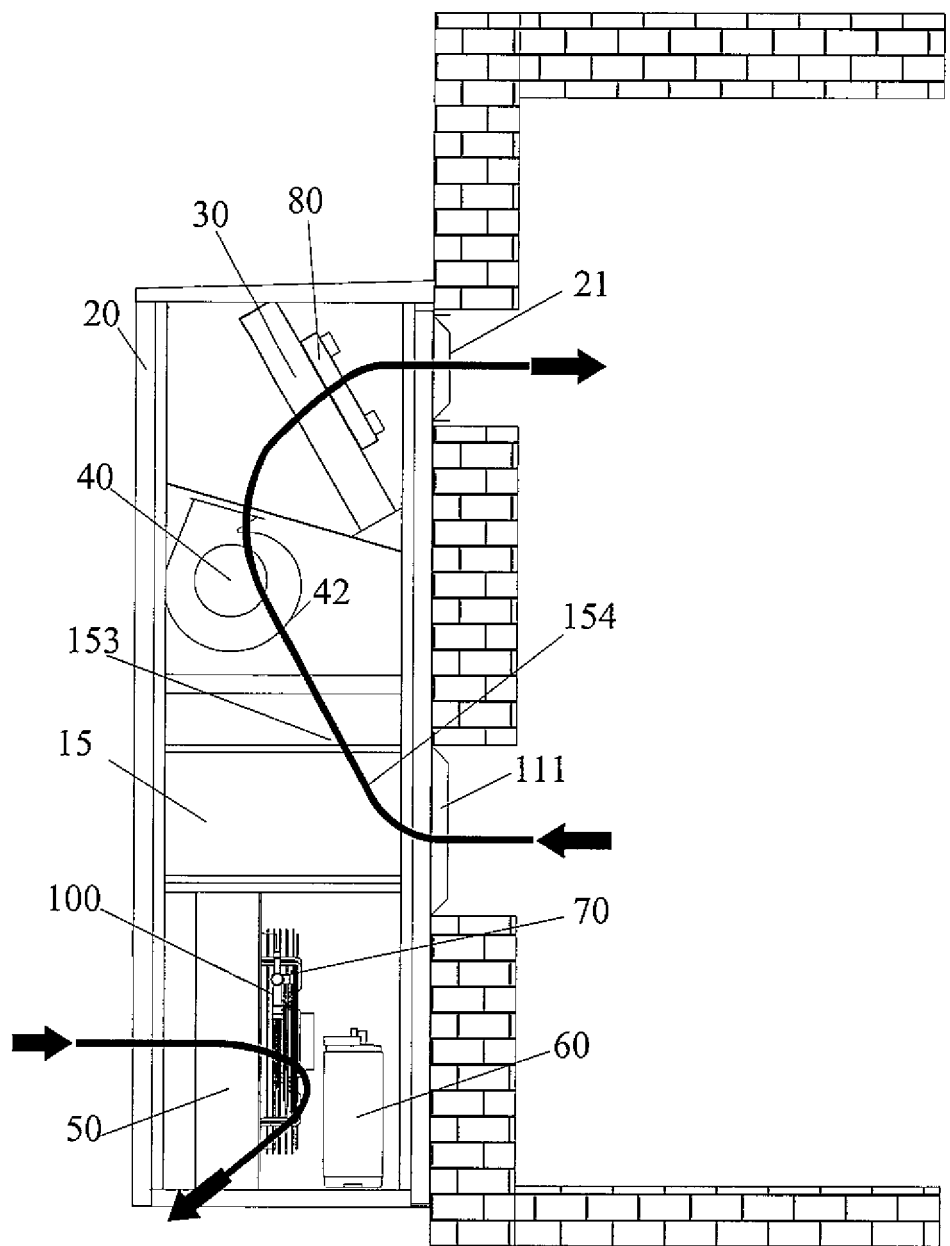
FIG. 24 illustrates a schematic structural composition diagram of an air conditioning system according to embodiment 3 of the present disclosure.

The difference between Embodiment 3 and Embodiment 1 lies in:

First, as shown in FIG. 24, in Embodiment 3 of the present disclosure, the plurality of replaceable assemblies include a blind plate assembly 15, the blind plate assembly 15 is disposed in the first cavity 11 of the housing 20, a third air inlet 154 of the blind plate assembly 15 is communicated with the indoor air return port 111, and a third air outlet 153 of the blind plate assembly 15 is provided correspondingly to a second air inlet 42 of the first air supply mechanism 40.

According to the above arrangement, the blind plate assembly 15 prevents fresh air from entering indoors, and the indoor return air enters the air conditioning system through the indoor air return port 111. After the air conditioning system heats or cools, a processed indoor return air enters again indoors through the indoor air supply port 21. In this way, when the replaceable assembly is the blind plate assembly 15 disposed in the first cavity 11, the air conditioning system has only cooling and heating functions.

Figure 25:
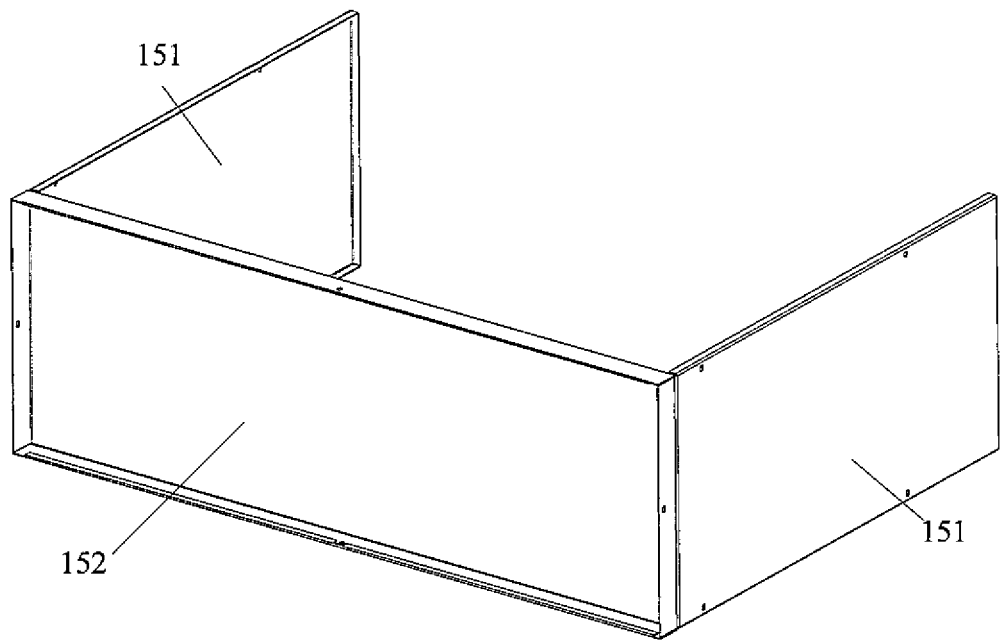
FIG. 25 illustrates a schematic stereostructure diagram of a blind plate assembly of the air conditioning system in FIG. 24.

Second, specifically, as shown in FIG. 25, in Embodiment 3 of the present disclosure, the blind plate assembly 15 includes two blocking plates 151 arranged oppositely and a connecting plate 152 connecting the two blocking plates 151.

In the above arrangement, one of the two blocking plates 151 can block fresh air from entering the housing 20, thus preventing fresh air from entering indoors. When the replaceable assembly is the blind plate assembly 15 disposed in the first cavity 11, the air conditioning system has only cooling and heating functions.

The other structures of Embodiment 3 are the same as those of Embodiment 1, and are not repeated here.

Embodiment 4

Figure 27:
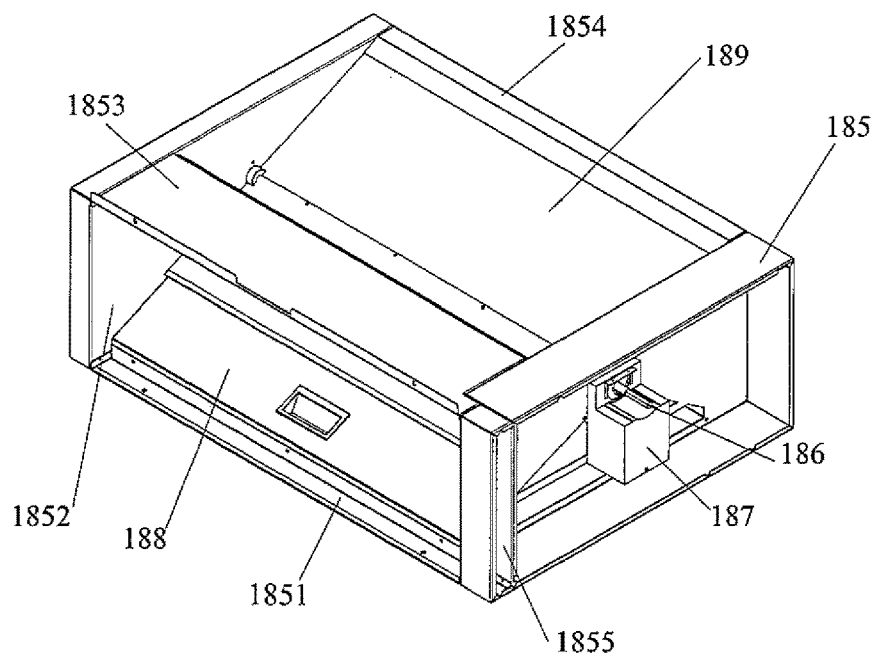
FIG. 27 illustrates a schematic stereostructure diagram of a second air valve assembly of the air conditioning system in FIG. 26.

The difference between Embodiment 4 and Embodiment 1 lies in:

First, in some embodiments, as shown in FIG. 27, the second air valve assembly 180 includes a rotary shaft 186 and an air valve baffle 189 connected with the rotary shaft 186. The air valve baffle 189 is rotatably disposed so as to be at the first position A or the second position B. In some embodiments, the second air valve assembly 180 further includes a second air valve actuator 187. The second air valve actuator 187 is configured to drive the air valve baffle 189 to switch between the first position A and the second position B.

Of course, in order to integrate the above assemblies together, the second air valve assembly 180 further includes a fourth case 185. The rotary shaft 186, the air valve baffle 189, a front sealing plate 188 and the second air valve actuator 187 are located in the fourth case 185.

According to the above arrangement, the fourth case 185 provides an installation space for the rotary shaft 186, the air valve baffle 189 and the second air valve actuator 187. The second air valve actuator 187 is configured to drive the rotary shaft 186 to rotate, thereby driving the air valve baffle 189 to rotate, enabling the second air valve actuator 187 to control the amount of fresh air, or achieving the function of turning on or off the intake of fresh air.

When the air valve baffle 189 is at the second position B, the indoor air return port 111 is only communicated with the fourth air supply port 183, and the second air valve assembly 180 further includes a front sealing plate 188 arranged in the fourth case 185.

Second, in some embodiments, as shown in FIG. 27, the fourth case 185 includes a fourth support frame 1855, a support bottom plate 1851, a side wall plate 1852, an upper cover plate 1853, and a rear upper plate 1854. The support bottom plate 1851 is arranged at a bottom of the fourth support frame 1855. There are two side wall plates 1852, which are respectively disposed at the left and right ends of the fourth support frame 1855, wherein the left side of the fourth support frame 1855 opposites to the right side. The upper cover plate 1853 and the rear upper plate 1854 are disposed at a top of the fourth support frame 1855. The second air valve actuator 187 is disposed on one of the two side wall plates 1852, and the second air valve actuator 187 is connected with the rotary shaft 186.

Figure 26:
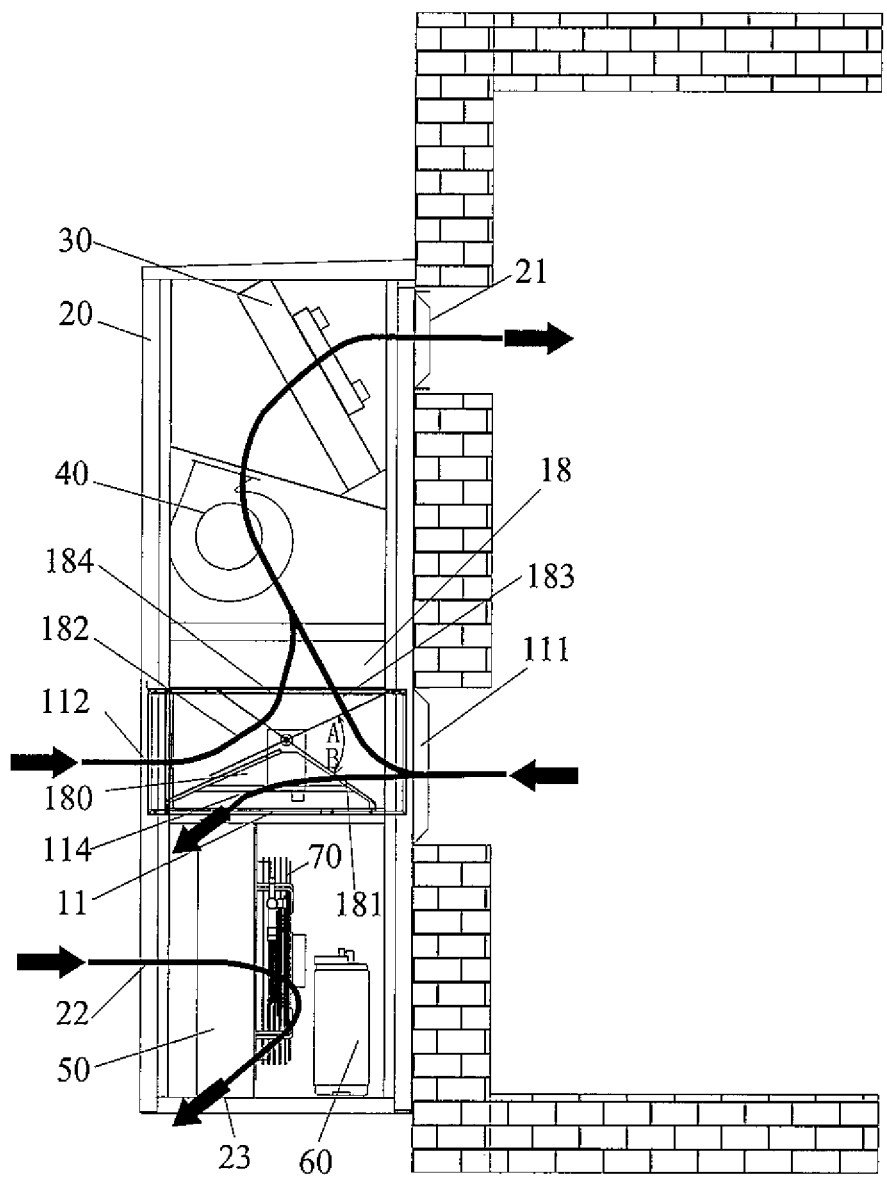
FIG. 26 illustrates a schematic structural composition diagram of an air conditioning system according to embodiment 4 of the present disclosure.

Third, in some embodiments, as shown in FIG. 26, when the second air valve assembly 180 is at the first position A, the indoor air return port 111 is communicated with the fourth air outlet 114 of the housing 20 through a third air duct 181, the first outdoor air inlet 112 is communicated with a fifth air supply port 184 of the second air valve assembly 180 through a fourth air duct 182, and the indoor air return port 111 is not communicated with a fourth air supply port 183 of the second air valve assembly 180; and when the second air valve assembly 180 is at the second position B, the indoor air return port 111 is communicated with the fourth air supply port 183 of the second air valve assembly 180, the indoor air return port 111 is not communicated with the fourth air outlet 114 of the housing 20, and the first outdoor air inlet 112 is not communicated with the fifth air supply port 184 of the second air valve assembly 180.

It is to be noted that when the air valve baffle 189 is rotated at the first position A, outdoor air enters the air conditioning system through the fourth air duct 182 and is transported to the indoor air supply port 21 through the first air supply mechanism 40. The indoor return air enters the third air duct 181 through the indoor return air port 111, and flows from the fourth air outlet 114 to an outside of the air conditioning system. In this case, the compressor 60 is stopped, only the first air supply mechanism 40 needs to be opened, and outdoor air with a lower temperature can be transported indoors, thereby achieving the purpose of energy saving. When the air valve baffle 189 is rotated at the second position B, the outdoor air is blocked and cannot enter the air conditioning system. The indoor return air enters the first air supply mechanism 40 through the indoor air return port 111 and the fourth air supply port 183, and then is sent out from the indoor air supply port 21. At this time, the air conditioning system has no natural cooling function, and the compressor 60 and the like are all operating normally.

Figure 28:
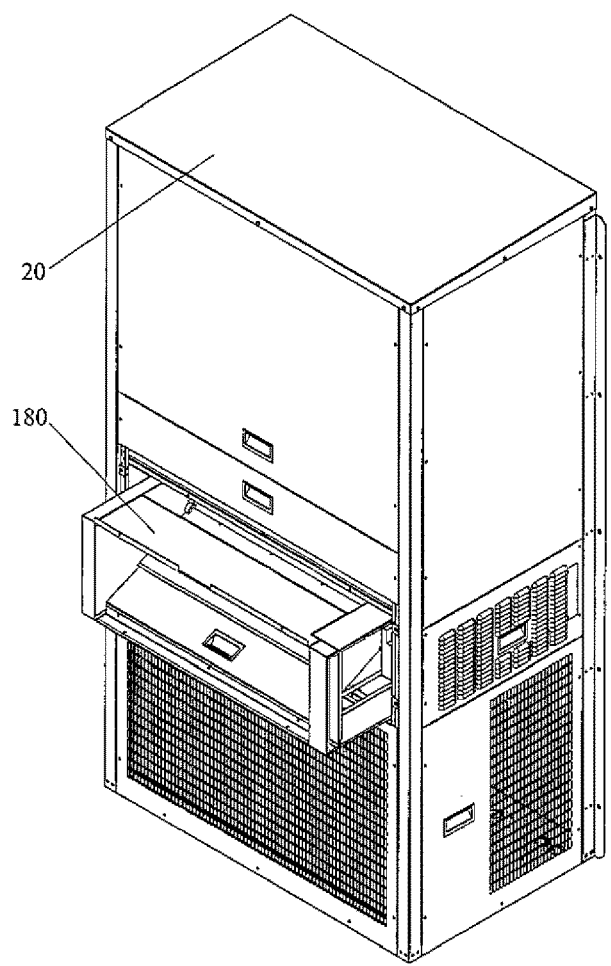
FIG. 28 illustrates a schematic stereostructure diagram of the second air valve assembly in FIG. 27 cooperated with a housing (the second air valve assembly has not been completely installed in the housing herein)
Figure 29:
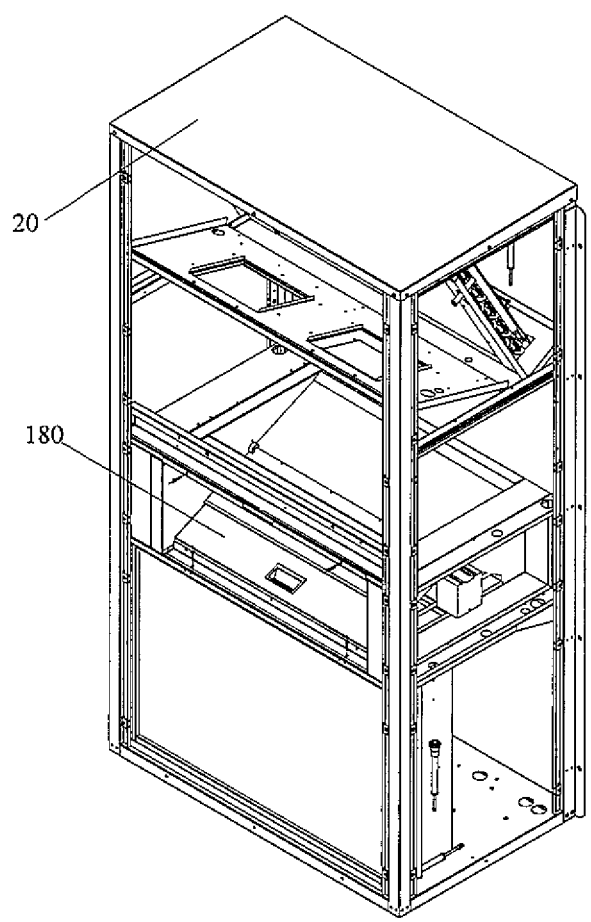
FIG. 29 illustrates a schematic stereostructure diagram of the second air valve assembly in FIG. 27 completely assembled with a housing (an installation panel on the housing is not shown herein).

Fourth, in some embodiments, as shown in FIG. 28 and FIG. 29, the second air valve assembly 180 is disposed in the housing 20 in a drawable manner. When the second air valve assembly 180 needs to be installed, the second air valve assembly 180 is pushed into the first cavity 11 from one side of the housing 20 until it cannot be pushed, and the second air valve assembly 180 is fixed into the first cavity 11 by bolts.

The other structures of Embodiment 4 are the same as those of Embodiment 1, and are not repeated here.

From the above description, it can be seen that the above embodiments of the present disclosure achieve the following technical effects: the fresh air heat recovery assembly and the first air valve assembly form a modular overall structure, so that when the overall structure is applied to the field of air conditioning, the above overall structure can be directly embedded in the housing of an air conditioner, labor and Installation costs are effectively saved, and assembly efficiency is improved. In addition, outdoor fresh air enters the second heat exchange passage in the fresh air heat recovery assembly through the first outdoor air inlet, and indoor return air enters the first air valve assembly through the indoor air return port. When the air conditioner is in a heating mode (heat pump operation mode), part of the indoor return air flows out through the second air supply port, and the other part of the indoor return air enters the first heat exchange passage of the fresh air heat recovery assembly. Thus, the outdoor fresh air having a lower temperature in the second heat exchange passage exchanges heat with the indoor return air having a higher temperature in the first heat exchange passage, so that the temperature of the outdoor fresh air in the second heat exchange passage increases, and when the air conditioning system supplies fresh air, a heat recovery function for the indoor return air is achieved, thereby reducing the energy consumption of the air conditioning system and meeting the energy-saving requirements of air conditioning equipment. When the air conditioner is in a cooling mode, part of the indoor return air flows out through the second air supply port, and the other part of the indoor return air enters the first heat exchange passage of the fresh air heat recovery assembly. Thus, the outdoor fresh air having a higher temperature in the second heat exchange passage exchanges heat with the indoor return air having a lower temperature in the first heat exchange passage, so that the temperature of the outdoor fresh air in the second heat exchange passage decreases, and when the air conditioning system supplies fresh air, a heat recovery function for the indoor return air is achieved, thereby reducing the energy consumption of the air conditioning system and meeting the energy-saving requirements of air conditioning equipment. The combination of the air baffle assembly and the first air valve assembly can realize that the air conditioning system transports outdoor fresh air indoors in a cooling or heating working mode. In this way, while the air conditioning system has cooling and heating functions, it also has the function of introducing fresh air. The blind plate assembly blocks fresh air from entering indoors, and the indoor return air enters the air conditioning system through the indoor air return port. After the air conditioning system heats or cools, the processed indoor return air enters again indoors through the indoor air supply port. In this way, when the replaceable assembly is a blind plate disposed in the first cavity, the air conditioning system has only cooling and heating functions. When the air valve baffle of the second air valve assembly is rotated at the first position A, outdoor air enters the air conditioning system through the fourth air duct and is transported to the indoor air supply port through the first air supply mechanism. The indoor return air enters the third air duct through the indoor return air port, and flows from the fourth air outlet to the outside of the air conditioning system. In this case, the compressor is stopped, only the first air supply mechanism needs to be opened, and outdoor air with a lower temperature can be transported indoors, thereby realizing the function of natural cold air of the air conditioning system and achieving the purpose of energy saving.

It is apparent that the described embodiments are only a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

It is to be noted that the specification and claims of the application and the terms "first", "second" and the like in the drawings are used to distinguish similar objects, and do not need to describe a specific sequence or a precedence order. It will be appreciated that data used in such a way may be exchanged under appropriate conditions, in order that the implementation manners of the application described here can be implemented in a sequence other than sequences graphically shown or described here.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

What is claimed is:

1. An air conditioning system, comprising:
a housing, comprising an indoor air supply port;
a first heat exchanger, disposed in the housing, comprising a first air outlet communicated with the indoor air supply port and a first air inlet;
a first air supply mechanism, disposed in the housing, a second air outlet of the first air supply mechanism being provided correspondingly to the first air inlet; and
a plurality of replaceable assemblies, each of the plurality of replaceable assemblies can be assembled in the housing, the housing being selectively cooperated with one or more of the plurality of replaceable assemblies;
wherein the plurality of replaceable assemblies comprise a blind plate assembly, an air baffle assembly, a first air valve assembly, a fresh air heat recovery assembly and a second air valve assembly, a modular structure formed by the fresh air heat recovery assembly and the first air valve assembly, a modular structure formed by the air baffle assembly and the first air valve assembly, the blind date assembly or the second air valve assembly is respectively arranged in a first cavity of the housing;
wherein the housing further comprises an indoor air return port spaced apart from the indoor air supply port, when the blind plate assembly is disposed in the first cavity of the housing, a third air outlet of the blind plate assembly is provided correspondingly to a second air inlet of the first air supply mechanism, and a third air inlet of the blind plate assembly is communicated with the indoor air return port;
when the fresh air heat recovery assembly and the first air valve assembly are both disposed in the cavity, the fresh air heat recovery assembly comprises a first heat exchange passage and a second heat exchange passage exchanging heat with each other, and the first air valve assembly is located between the air baffle assembly and the indoor air return port.

2. The air conditioning system according to claim 1, wherein the housing further comprises a fourth air outlet and a first outdoor air inlet, the blind plate assembly comprises two blocking plates arranged oppositely and a connecting plate connecting the two blocking plates, one of the two blocking plates is used to seal the fourth air outlet, and the connecting plate is used to seal the first outdoor air inlet.

3. The air conditioning system according to claim 1, wherein when the air baffle assembly and the first air valve assembly are both disposed in the first cavity, the first air valve assembly is located between the air baffle assembly and the indoor air return port.

4. The air conditioning system according to claim 3, wherein the air baffle assembly comprises a first air duct and a second air duct spaced apart from each other; the first air valve assembly has a first position and a second position; when the first air valve assembly is at the first position, the indoor air return port is communicated with the fourth air outlet of the housing by the first air duct, and a first outdoor air inlet of the housing is communicated with a first air supply port of the air baffle assembly by the second air duct; and when the first air valve assembly is at the second position, the first air valve assembly is blocked between the first outdoor air inlet and the first air supply port, and the indoor air return port is communicated with a second air supply port of the first air valve assembly.

5. The air conditioning system according to claim 4, wherein the air baffle assembly comprises:
a third case; and
a baffle plate, disposed in the third case, when the air baffle assembly is installed in the first cavity of the housing, a dosed space being formed in the air baffle assembly, and the baffle plate partitioning the closed space into the first air duct and the second air duct spaced apart from each other.

6. The air conditioning system according to claim 4, wherein the first air valve assembly comprises:
a second case;
a baffle assembly, located in the second case, the baffle assembly comprising a rotating shaft and a baffle connected with the rotating shaft; and
a first air valve actuator, disposed in the second case, the first air valve actuator being drivingly connected with the baffle so that the baffle is rotatably arranged.

7. The air conditioning system according to claim 1, wherein the first air valve assembly has a first position and a second position; when the first air valve assembly is at the first position, the indoor air return port is communicated with a fourth air outlet of the housing by the first heat exchange passage, the indoor air return port is communicated with a second air supply port of the first air valve assembly, and a first outdoor air inlet of the housing is communicated with a third air supply port of the fresh air heat recovery assembly by the second heat exchange passage; and when the first air valve assembly is at the second position, the first air valve assembly is blocked between the first outdoor air inlet and the third air supply port of the fresh air heat recovery assembly, and the indoor air return port is communicated with the second air supply port.

8. The air conditioning system according to claim 7, wherein the fresh air heat recovery assembly further comprises:
   a first case;
   a fresh air fan, disposed in the first case, the fresh air fan being disposed correspondingly to the first outdoor air inlet, and the fresh air fan being used to transport fresh air from outside into the second heat exchange passage; and
   a heat exchanger body, disposed in the first case, the first heat exchange passage and the second heat exchange passage being disposed inside the heat exchanger body.

9. The air conditioning system according to claim 1, wherein the indoor air supply port is spaced apart from a first outdoor air inlet, when the second air valve assembly is disposed in the first cavity of the housing, second air valve assembly has a first position A and a second position B; when the second air valve assembly is at the first position A, the indoor air return port is communicated with a fourth air outlet of the housing, the first outdoor air inlet is communicated with a fifth air supply port of the second air valve assembly, and the indoor air return port is separated from a fourth air supply port of the second air valve assembly; and when the second air valve assembly is at the second position B, the indoor air return port is communicated with the fourth air supply port of the second air valve assembly, the indoor air return port is separated from the fourth air outlet of the housing, and the first outdoor air inlet is separated from the fifth air supply port of the second and air valve assembly.

10. The air conditioning system according to claim 9, wherein the second air valve assembly comprises:
    a fourth case;
    a rotary shaft, disposed in the fourth case;
    an air valve baffle, disposed in the fourth case, the air valve baffle being connected with the rotary shaft; and
    a second air valve actuator, disposed in the fourth case, the second air valve actuator being drivingly connected with the air valve baffle so that the air valve baffle is rotatably arranged.

11. The air conditioning system according to claim 1, further comprising an electric heating assembly disposed on the housing, the electric heating assembly being disposed in a drawable manner with respect to the housing.

12. The air conditioning system according to claim 11, wherein track structures are disposed on side walls of the housing, and two ends of the electric heating assembly are provided with slide grooves cooperated with the track structures.

13. The air conditioning system according to claim 1, wherein the housing further comprises a second cavity spaced apart from a first cavity of the housing, and a second heat exchanger and a compressor are disposed in the second cavity.

14. The air conditioning system according to claim 1, further comprising a condensing fan assembly, the condensing fan assembly being slidably disposed with respect to the housing.

15. The air conditioning system according to claim 1, further comprising a frequency converter assembly, the frequency converter assembly being slidably disposed with respect to the housing.

16. The air conditioning system according to claim 1, wherein the first air valve assembly comprises:
    a second case;
    a baffle assembly, located in the second case, the baffle assembly comprising a rotating shaft and a baffle connected with the rotating shaft; and
    a first air valve actuator, disposed in the second case, the first air valve actuator being drivingly connected with the baffle so that the baffle is rotatably arranged.

* * * * *